US012054372B2

(12) United States Patent
Prasetiawan et al.

(10) Patent No.: US 12,054,372 B2
(45) Date of Patent: Aug. 6, 2024

(54) SCISSOR LIFT WITH ELECTRIC ACTUATOR

(71) Applicant: Oshkosh Corporation, Oshkosh, WI (US)

(72) Inventors: Eko Prasetiawan, Oshkosh, WI (US); Louis Bafile, Oshkosh, WI (US); Prabhu Shankar, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/200,171

(22) Filed: May 22, 2023

(65) Prior Publication Data

US 2023/0286792 A1      Sep. 14, 2023

Related U.S. Application Data

(63) Continuation of application No. 17/328,885, filed on May 24, 2021, now Pat. No. 11,820,631, which is a
(Continued)

(51) Int. Cl.
*B66F 17/00*     (2006.01)
*B66F 11/04*     (2006.01)
(Continued)

(52) U.S. Cl.
CPC .......... *B66F 17/006* (2013.01); *B66F 11/042* (2013.01); *F16H 2025/2081* (2013.01); *F16H 25/2204* (2013.01); *F16H 25/2472* (2013.01)

(58) Field of Classification Search
CPC ......... B66F 11/00; B66F 11/04; B66F 11/042; B66F 17/006; B66F 7/06; B66F 7/065;
(Continued)

(56) References Cited

U.S. PATENT DOCUMENTS 3,596,735 A   8/1971   Denier
3,817,346 A   6/1974   Wehmeyer
(Continued)

FOREIGN PATENT DOCUMENTS

CN       1129371 A      8/1996
CN     101397109 A      4/2009
(Continued)

OTHER PUBLICATIONS

International Search Report and Written Opinion on PCT/US2020/021351, dated Sep. 29, 2020, 21 pages.
(Continued)

*Primary Examiner* — Tyrone V Hall, Jr.
(74) *Attorney, Agent, or Firm* — Foley & Lardner LLP

(57) ABSTRACT

A scissor lift includes a base, a platform configured to support a load, a lift assembly having a first end coupled to the base and a second end coupled to the platform, and a linear actuator coupled to the lift assembly and configured to extend to raise the platform relative to the base. The lift assembly includes a series of support members that are pivotally coupled to one another. The linear actuator includes a screw, a nut engaging the screw, and an electric motor configured to drive rotation of the screw relative to the nut to control extension of the linear actuator.

20 Claims, 21 Drawing Sheets

Related U.S. Application Data continuation-in-part of application No. 16/811,196, filed on Mar. 6, 2020, now Pat. No. 11,014,796, and a continuation-in-part of application No. 16/811,659, filed on Mar. 6, 2020, now Pat. No. 11,148,922.

(60) Provisional application No. 62/829,837, filed on Apr. 5, 2019, provisional application No. 62/829,853, filed on Apr. 5, 2019.

(51) Int. Cl.
 *F16H 25/20* (2006.01)
 *F16H 25/22* (2006.01)
 *F16H 25/24* (2006.01)

(58) Field of Classification Search
 CPC .. B66F 7/0658; B66F 7/0666; B66F 9/07581; G01G 19/08; G01L 1/005; G05F 2700/12; G05F 2700/16; G05F 2700/20
 See application file for complete search history.

(56) References Cited

U.S. PATENT DOCUMENTS

| | | | |
|---|---|---|---|
| 5,553,825 | A | 9/1996 | Rasmussen |
| 6,044,927 | A | 4/2000 | Newlin |
| 6,286,629 | B1 | 9/2001 | Saunders |
| 7,489,098 | B2 | 2/2009 | Harris et al. |
| 7,671,547 | B2 | 3/2010 | Addleman |
| 7,683,564 | B2 | 3/2010 | Harris et al. |
| 8,291,782 | B1 | 10/2012 | Shaheen et al. |
| 8,496,204 | B1 | 7/2013 | Charafeddine et al. |
| 9,233,819 | B2 | 1/2016 | Wagner et al. |
| 9,776,846 | B2 | 10/2017 | Ditty |
| 9,791,071 | B2 | 10/2017 | Ditty et al. |
| 9,963,081 | B1* | 5/2018 | Taylor ................ B66F 7/08 |
| 10,065,843 | B2* | 9/2018 | Ahern ................ B66F 11/042 |
| 10,174,868 | B2 | 1/2019 | Ditty et al. |
| 10,336,596 | B2 | 7/2019 | Puszkiewicz et al. |
| 10,357,995 | B2 | 7/2019 | Palmer et al. |
| 10,472,889 | B1 | 11/2019 | Betz |
| 10,479,664 | B2 | 11/2019 | Linsmeier et al. |
| 10,611,347 | B1 | 4/2020 | Archer et al. |
| 10,617,900 | B1 | 4/2020 | Linsmeier et al. |
| 10,829,355 | B2 | 11/2020 | Puszkiewicz et al. |
| 2002/0029930 | A1 | 3/2002 | Bassett, Jr. |
| 2002/0125662 | A1 | 9/2002 | Magness |
| 2011/0060488 | A1 | 3/2011 | Nakazawa |
| 2011/0084245 | A1 | 4/2011 | Penenburgh |
| 2014/0190291 | A1* | 7/2014 | Medina ................ F16H 25/205 74/89.23 |
| 2014/0332317 | A1 | 11/2014 | Campbell et al. |
| 2015/0204427 | A1 | 7/2015 | Gonzalez-Tablas et al. |
| 2016/0297643 | A1 | 10/2016 | Lowe |
| 2017/0253283 | A1 | 9/2017 | Eidelson |
| 2017/0350480 | A1 | 12/2017 | Stachniak |
| 2018/0045291 | A1 | 2/2018 | Teyssier et al. |
| 2018/0132477 | A1 | 5/2018 | Yelle et al. |
| 2018/0148308 | A1 | 5/2018 | Yin et al. |
| 2018/0194454 | A1 | 7/2018 | Olson et al. |
| 2019/0101197 | A1 | 4/2019 | Gavriliuc et al. |
| 2019/0137006 | A1 | 5/2019 | Ditty et al. |
| 2019/0359460 | A1 | 11/2019 | Linsmeier et al. |
| 2020/0071996 | A1 | 3/2020 | Betz |
| 2020/0139804 | A1 | 5/2020 | Holmes et al. |
| 2020/0140248 | A1 | 5/2020 | Hackenberg et al. |
| 2020/0140249 | A1 | 5/2020 | Hackenberg et al. |
| 2020/0231131 | A1 | 7/2020 | Archer et al. |
| 2020/0238115 | A1 | 7/2020 | Linsmeier et al. |
| 2020/0284329 | A1* | 9/2020 | Soltermann ......... F16H 25/2021 |
| 2020/0290853 | A1 | 9/2020 | Neubauer et al. |
| 2020/0290855 | A1 | 9/2020 | Bruno et al. |
| 2020/0317065 | A1 | 10/2020 | Lombardo |
| 2020/0317256 | A1 | 10/2020 | Hao et al. |
| 2020/0317480 | A1 | 10/2020 | Shankar et al. |
| 2020/0317486 | A1 | 10/2020 | Puszkiewicz et al. |
| 2020/0317488 | A1 | 10/2020 | Bafile et al. |
| 2020/0317489 | A1 | 10/2020 | Bhatia et al. |
| 2020/0317491 | A1 | 10/2020 | Bafile et al. |
| 2020/0317492 | A1 | 10/2020 | Bhatia et al. |
| 2020/0317493 | A1 | 10/2020 | Lombardo et al. |
| 2020/0317494 | A1 | 10/2020 | Bafile et al. |
| 2020/0393027 | A1 | 12/2020 | Ricard et al. |
| 2021/0062898 | A1 | 3/2021 | Medina et al. |
| 2021/0078824 | A1 | 3/2021 | Nash et al. |
| 2021/0276423 | A1 | 9/2021 | Lombardo et al. |
| 2021/0276848 | A1 | 9/2021 | Miller et al. |
| 2021/0276850 | A1 | 9/2021 | Lombardo et al. |
| 2021/0279991 | A1 | 9/2021 | Shankar et al. |

FOREIGN PATENT DOCUMENTS

| | | | |
|---|---|---|---|
| CN | 203006872 | U | 6/2013 |
| CN | 103625998 | A | 3/2014 |
| CN | 203807087 | U | 9/2014 |
| CN | 205616511 | U | 10/2016 |
| CN | 109081262 | A | 12/2018 |
| DE | 91 02 098 | U1 | 6/1992 |
| JP | H558600 | A | 3/1993 |
| JP | H06-286998 | A | 10/1994 |
| JP | 2001-031389 | A | 2/2001 |
| JP | 2003-002598 | A | 1/2003 |
| JP | 2004-001908 | A | 1/2004 |
| JP | 2007-099439 | A | 4/2007 |
| JP | 4456199 | B2 | 4/2010 |

OTHER PUBLICATIONS

MHA Products, "Lifting & Elevating Equipment," Oct. 30, 2018, 49 pages.
Spackman, H. M., "Mathematical Analysis of Scissor Lifts," Naval Ocean Systems Center, San Diego, CA, Jun. 30, 1989, 67 pages.
Yunlong Ma et al, Electrical and electronic technology, pp. 130-131.

* cited by examiner

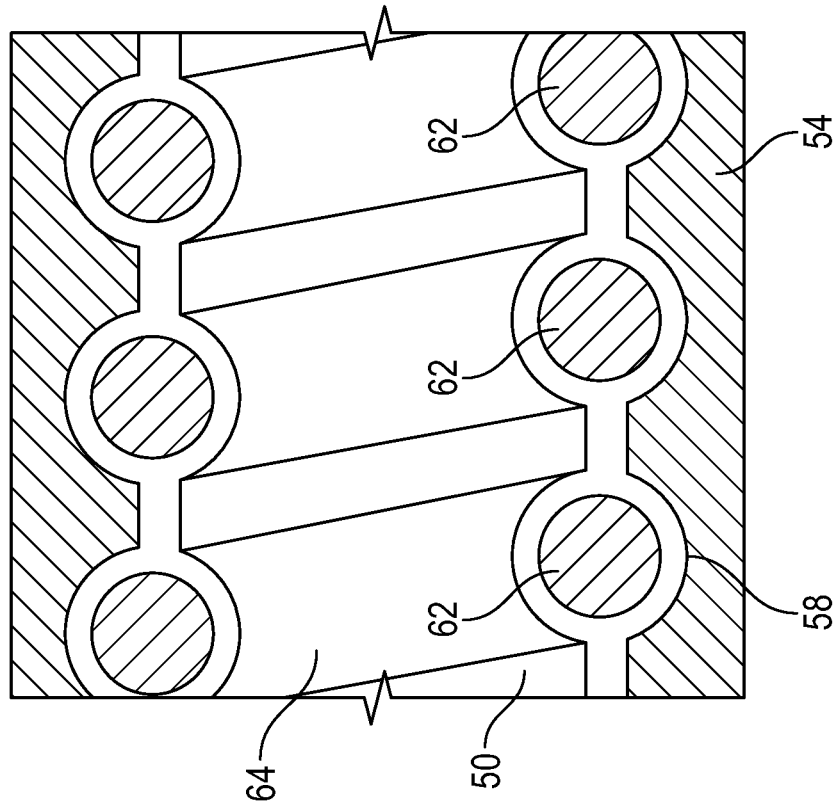
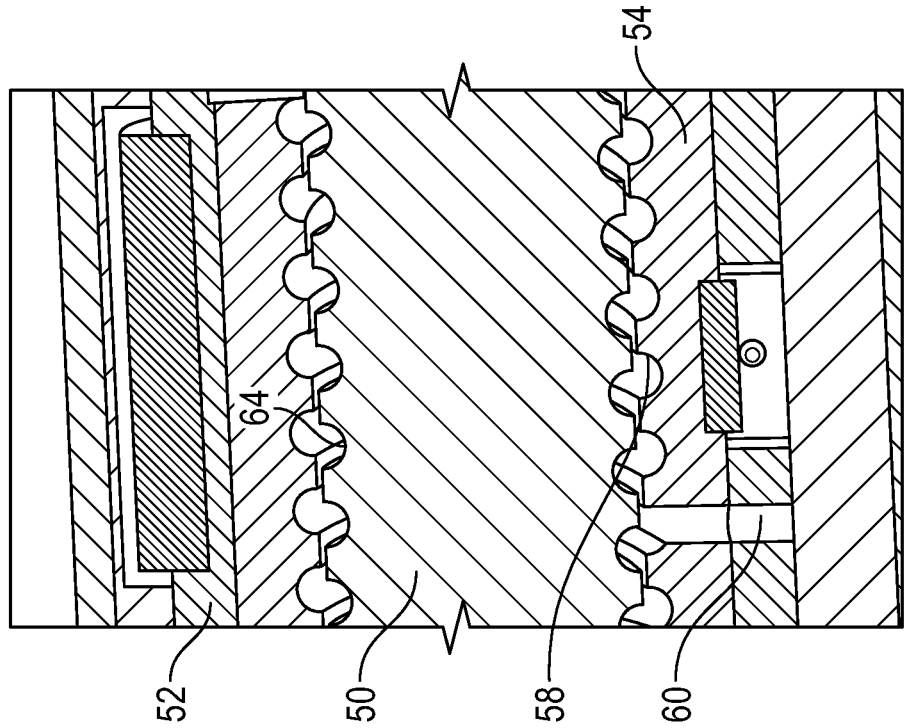

SCISSOR LIFT WITH ELECTRIC ACTUATOR

CROSS-REFERENCE TO RELATED APPLICATIONS

This application is a continuation of U.S. patent application Ser. No. 17/328,885, filed on May 24, 2021, which (i) is a continuation-in-part of U.S. patent application Ser. No. 16/811,659, filed on Mar. 6, 2020, which claims the benefit of U.S. Provisional Application No. 62/829,853, filed Apr. 5, 2019, and (ii) is a continuation-in-part of U.S. patent application Ser. No. 16/811,196, filed on Mar. 6, 2020, which claims the benefit of U.S. Provisional Application No. 62/829,837, filed Apr. 5, 2019, all of which are incorporated herein by reference in their entireties.

BACKGROUND

Lift devices commonly include a vertically movable platform that is supported by a foldable series of linked supports. The linked supports are arranged in an "X" pattern, crisscrossing with one another. A hydraulic cylinder generally controls vertical movement of the platform by engaging and rotating (i.e., unfolding) the lowermost set of linked supports, which in turn unfold the other linked supports within the system. The platform raises and lowers based upon the degree of actuation by the hydraulic cylinder. A hydraulic cylinder may also control various other vehicle actions, such as, for example, steering or platform tilt functions. Lift devices using one or more hydraulic cylinders require an on-board reservoir tank to store hydraulic fluid for the lifting process.

SUMMARY

One exemplary embodiment relates to a lift device. The lift device comprises a base, a retractable lift mechanism, a work platform, a linear actuator, and a lift controller. The base has a plurality of wheels. The retractable lift mechanism has a first end coupled to the base and is moveable between an extended position and a retracted position. The work platform is coupled to and supported by a second end of the retractable lift mechanism. The linear actuator is configured to selectively move the retractable lift mechanism between the extended position and the retracted position. The linear actuator comprises a central screw rod, an electric motor, and a nut assembly. The electric motor is configured to provide rotational actuation to the central screw rod. The nut assembly comprises a primary nut mechanism configured to translate the rotational actuation of the central screw rod into linear motion of the nut assembly. The lift controller is configured to receive a lift command from an operator and monitor at least one lift characteristic associated with the linear actuator. The lift controller is further configured to selectively inhibit the lift command based on the at least one characteristic.

Another exemplary embodiment relates to a lift device. The lift device comprises a base, a retractable lift mechanism, a work platform, a linear actuator, and a lift controller. The base has a plurality of wheels. The retractable lift mechanism has a first end coupled to the base and is moveable between an extended position and a retracted position. The work platform is configured to support a load. The work platform is coupled to and supported by a second end of the retractable lift mechanism. The linear actuator is configured to selectively move the retractable lift mechanism between the extended position and the retracted position. The lift controller is configured to monitor at least one lift characteristic associated with the linear actuator and to determine whether an actuator failure has been detected based on the at least one lift characteristic associated with the linear actuator.

Another exemplary embodiment relates to a lift device. The lift device comprises a base, a retractable lift mechanism, a work platform, a linear actuator, and a lift controller. The base has a plurality of wheels. The retractable lift mechanism includes a first end coupled to the base and is moveable between an extended position and a retracted position. The work platform is configured to support a load. The work platform is coupled to and supported by a second end of the retractable lift mechanism. The linear actuator is configured to selectively move the retractable lift mechanism between the extended position and the retracted position. The lift controller is configured to receive a lift command. The lift controller is further configured to monitor at least one lift characteristic associated with the linear actuator, where the at least one lift characteristic includes a measured value. The lift controller is further configured to inhibit the lift command based on the monitored at least one lift characteristic.

Another exemplary embodiment relates to a lift device. The lift device comprises a base, a retractable lift mechanism, a work platform, a linear actuator, and a lift controller. The base has a plurality of wheels. The retractable lift mechanism has a first end coupled to the base and is moveable between an extended position and a retracted position. The work platform is configured to support a load. The work platform is coupled to and supported by a second end of the retractable lift mechanism. The linear actuator is configured to selectively move the retractable lift mechanism between the extended position and the retracted position. The linear actuator comprises a central screw rod, an electric motor, and a nut assembly. The electric motor is configured to provide rotational actuation to the central screw rod. The nut assembly comprises a primary nut mechanism and a secondary nut mechanism. The primary nut mechanism is engaged with the central screw rod and configured to translate the rotational actuation of the central screw rod into translational motion to move the retractable lift mechanism between the extended position and the retracted position. The secondary nut mechanism is disengaged from the central screw rod. In an event of a primary nut mechanism failure, the secondary nut mechanism is configured to engage the central screw rod. The lift controller is configured to monitor at least one lift characteristic associated with the linear actuator and to determine whether an actuator failure has been detected based on the at least one lift characteristic associated with the linear actuator.

Another exemplary embodiment relates to a lift device. The lift device comprises a base, a retractable lift mechanism, a work platform, a linear actuator, and a lift controller. The base has a plurality of wheels. The retractable lift mechanism has a first end coupled to the base and is moveable between an extended position and a retracted position. The work platform is configured to support a load. The work platform is coupled to and supported by a second end of the retractable lift mechanism. The linear actuator is configured to selectively move the retractable lift mechanism between the extended position and the retracted position. The linear actuator comprises a central screw rod, an electric motor, and a nut assembly. The electric motor is configured to provide rotational actuation to the central screw rod. The nut assembly includes a first nut mechanism and a second nut mechanism. The first nut mechanism is configured to translate the rotational actuation of the central screw rod into translational motion. The second nut mechanism is configured to translate the rotation actuation of the central screw rod into translational motion. The linear actuator includes a first lift characteristic associated with the first nut mechanism and a second lift characteristic associated with the second nut mechanism. The lift controller is configured to receive a lift command and determine whether a monitored lift characteristic is substantially similar to the first lift characteristic or the second lift characteristic.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which:

FIG. 8A is a detail cross-sectional view of a primary nut mechanism of the nut assembly of FIG. 7;

FIG. 8B is a detail view of the primary nut mechanism of FIG. 8A;

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, the various exemplary embodiments disclosed herein relate to systems, apparatuses, and methods for detecting actuator failure on a lift device. The lift device includes a linear actuator having central screw rod, a primary nut mechanism, and a secondary nut mechanism. The secondary nut mechanism provides a failsafe or a backup nut mechanism in the event that the primary nut mechanism fails. A lift controller is additionally provided, which monitors various lift characteristics to determine both whether a maximum allowable motor torque has been exceeded and whether actuator failure has been detected. The lift controller is configured to alert an operator in the case of an actuator failure, and to inhibit unsafe operating conditions. The various exemplary embodiments disclosed herein further relate to systems, apparatuses, and methods for sensing a load supported by a work platform. In some embodiments, an electromagnetic brake of a lift actuator motor may be disengaged and the lift actuator motor may be used to maintain a work platform height. A lift controller may then be configured to determine the load supported by the work platform using various actuator/motor characteristics and a measured height of the work platform.

Figure 1A:
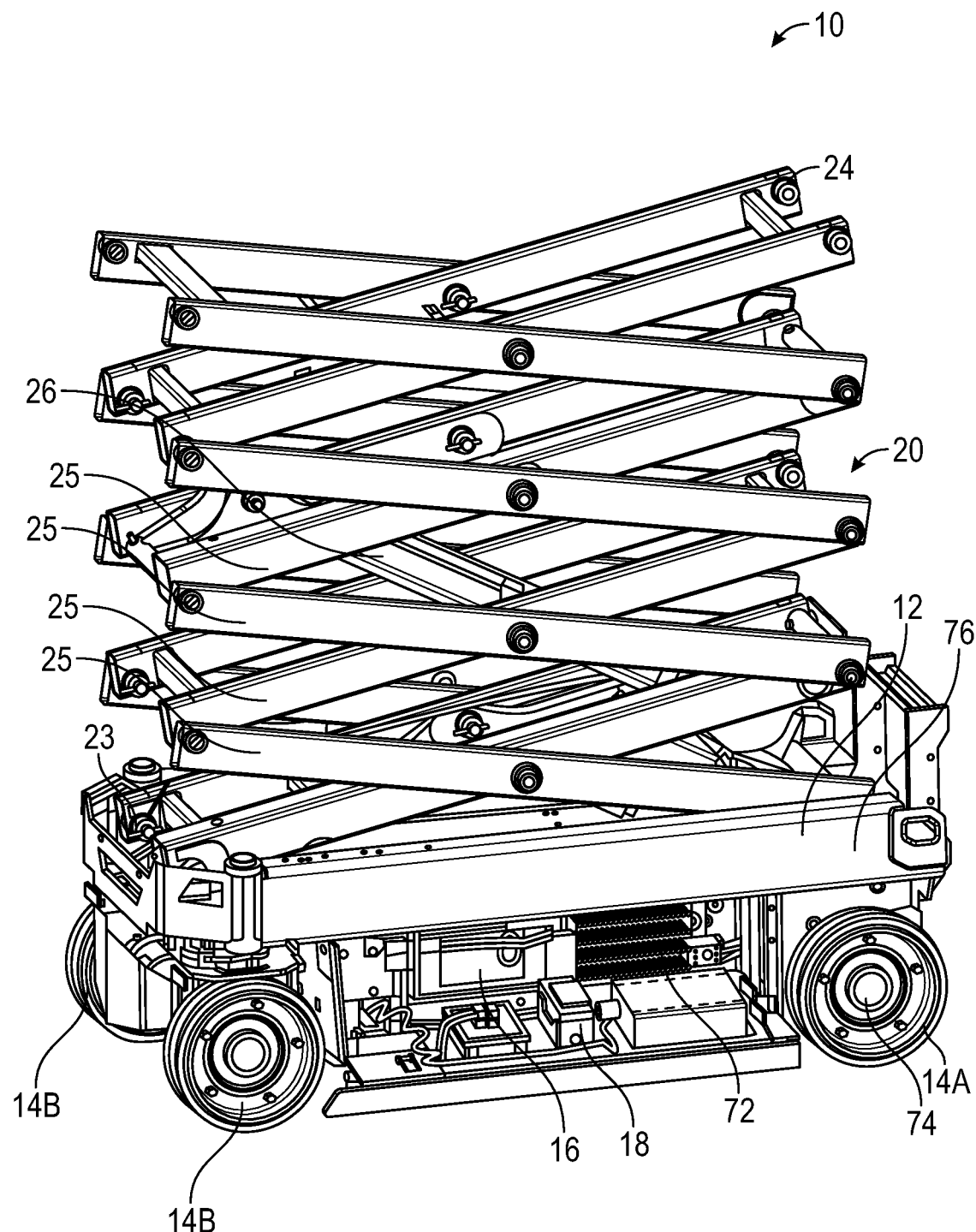
FIG. 1A is a side perspective view of a lift device in the form of a scissor lift, according to an exemplary embodiment.
Figure 1B:
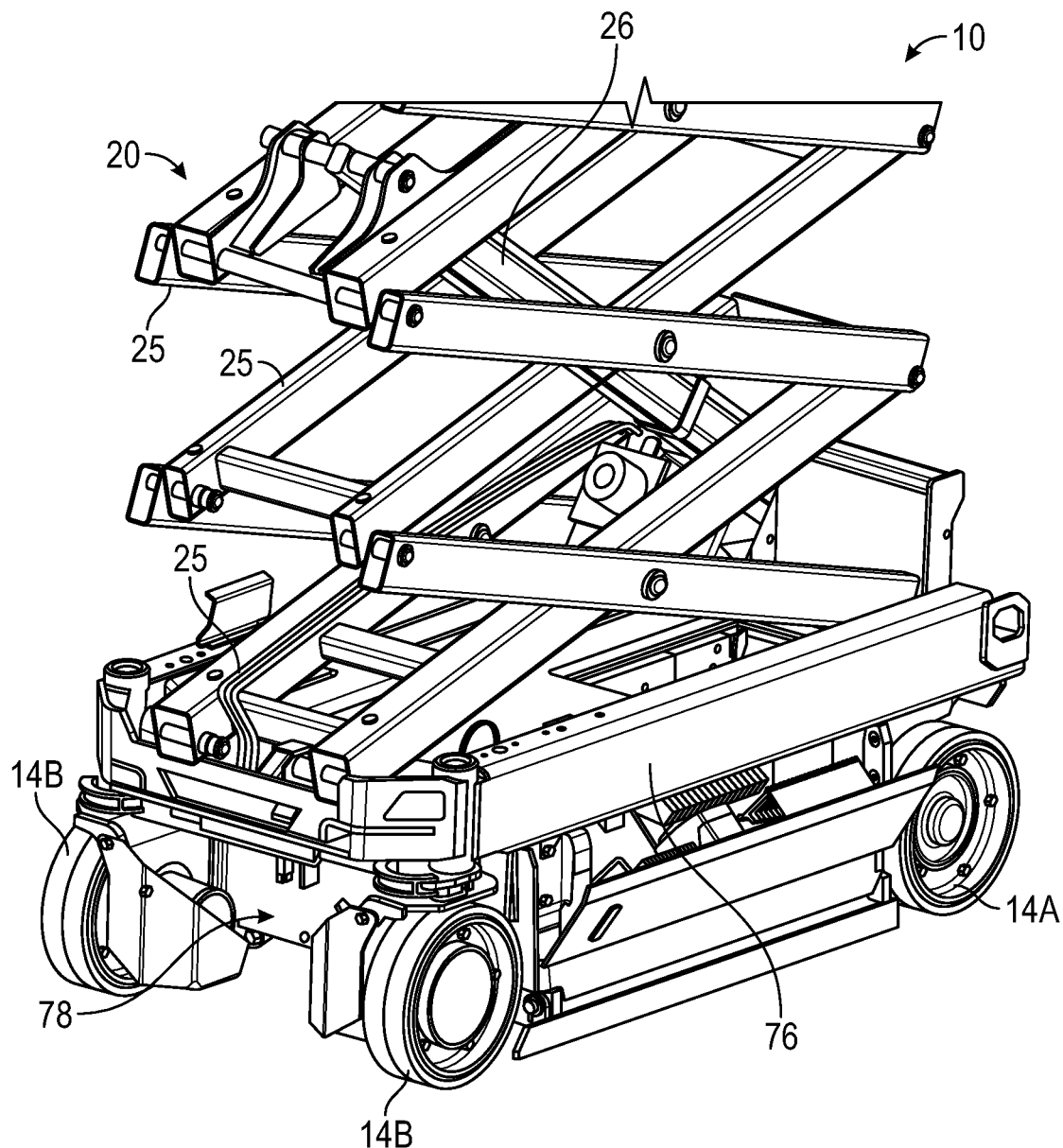
FIG. 1B is another side perspective view of the lift device of FIG. 1A.

According to the exemplary embodiment depicted in FIGS. 1A and 1B, a vehicle, shown as vehicle 10, is illustrated. In some embodiments, the vehicle 10 may be a scissor lift, for example, which can be used to perform a variety of different tasks at various elevations. The vehicle 10 includes a base 12 supported by wheels 14A, 14B positioned about the base 12. The vehicle 10 further includes a battery 16 positioned on board the base 12 of the vehicle 10 to supply electrical power to various operating systems present on the vehicle 10.

The battery 16 can be a rechargeable lithium-ion battery, for example, which is capable of supplying a direct current (DC) or alternating current (AC) to vehicle 10 controls, motors, actuators, and the like. The battery 16 can include at least one input 18 capable of receiving electrical current to recharge the battery 16. In some embodiments, the input 18 is a port capable of receiving a plug in electrical communication with an external power source, like a wall outlet. The battery 16 can be configured to receive and store electrical current from one of a traditional 120 V outlet, a 240 V outlet, a 480 V outlet, an electrical power generator, or another suitable electrical power source.

Figure 2A:
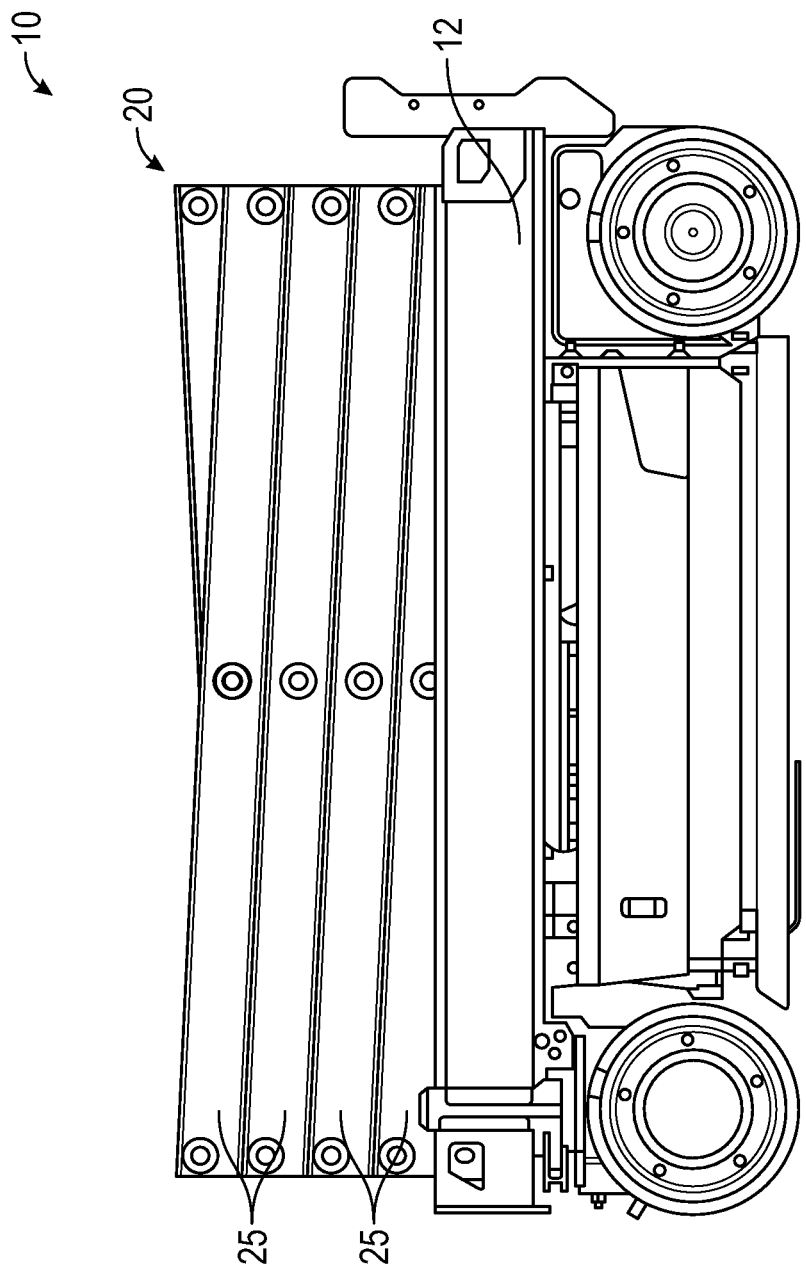
FIG. 2A is a side view of the lift device of FIG. 1A, shown in a retracted or stowed position.

The vehicle 10 further includes a retractable lift mechanism, shown as a scissor lift mechanism 20, coupled to the base 12. The scissor lift mechanism 20 supports a work platform 22 (shown in FIG. 3). As depicted, a first end 23 of the scissor lift mechanism 20 is anchored to the base 12, while a second end 24 of the scissor lift mechanism 20 supports the work platform 22. As illustrated, the scissor lift mechanism 20 is formed of a series of linked, foldable support members 25. The scissor lift mechanism 20 is selectively movable between a retracted or stowed position (shown in FIG. 2A) and a deployed or work position (shown in FIG. 2B) using an actuator, shown as linear actuator 26. The linear actuator 26 is an electric actuator. The linear actuator 26 controls the orientation of the scissor lift mechanism 20 by selectively applying force to the scissor lift mechanism 20. When a sufficient force is applied to the scissor lift mechanism 20 by the linear actuator 26, the scissor lift mechanism 20 unfolds or otherwise deploys from the stowed or retracted position into the work position. Because the work platform 22 is coupled to the scissor lift mechanism 20, the work platform 22 is also raised away from the base 12 in response to the deployment of the scissor lift mechanism 20.

Figure 3:
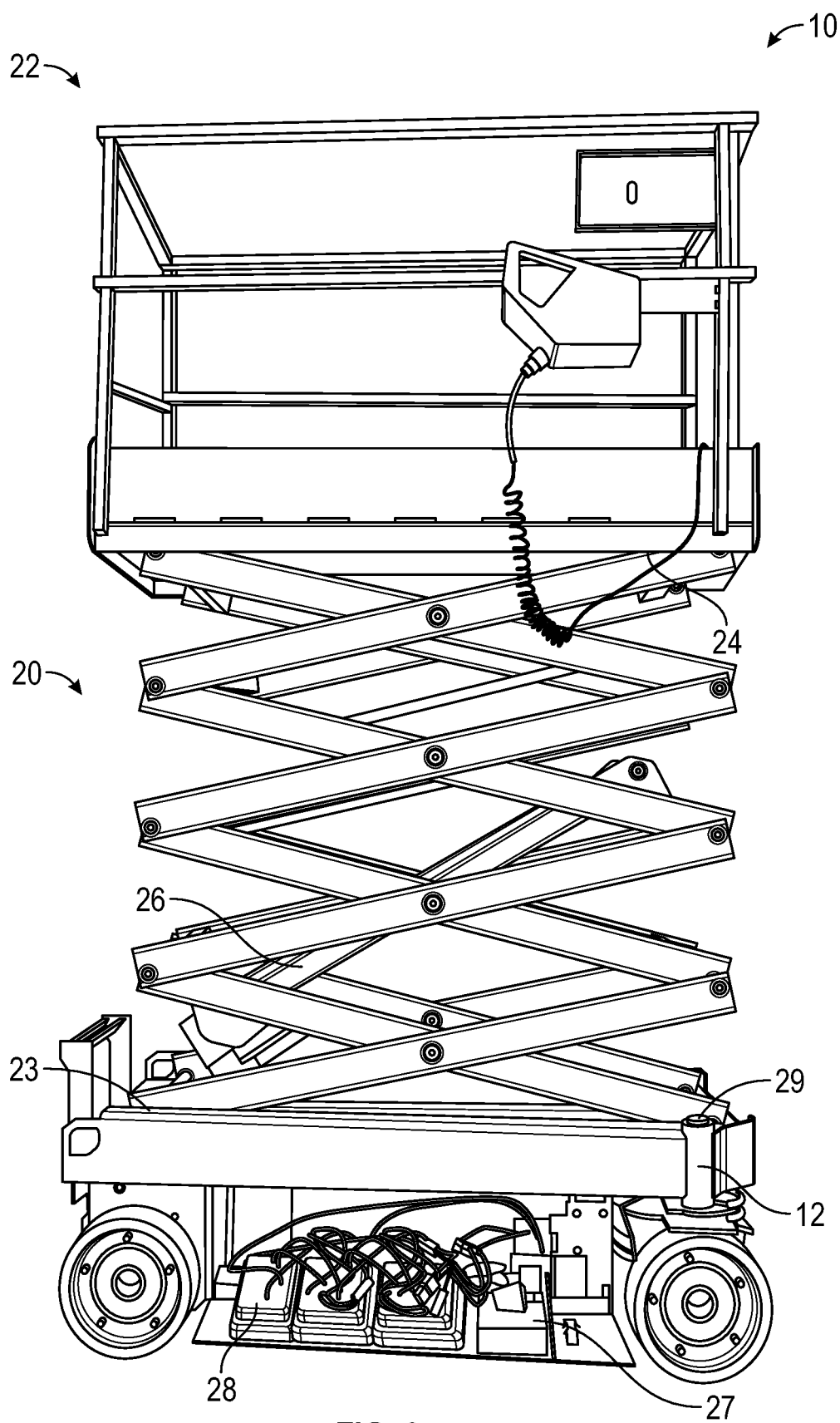
FIG. 3 is a side view of the lift device of FIG. 1A, depicting various vehicle controllers.

As shown in FIG. 3, the vehicle 10 further includes a vehicle controller 27 and a lift controller 28. The vehicle controller 27 is in communication with the lift controller 28 and is configured to control various driving systems on the vehicle 10. The lift controller 28 is in communication with the linear actuator 26 to control the movement of the scissor lift mechanism 20. Communication between the lift controller 28 and the linear actuator 26 and/or between the vehicle controller 27 and the lift controller 28 can be provided through a hardwired connection, or through a wireless connection (e.g., Bluetooth, Internet, cloud-based communication system, etc.). It should be understood that each of the vehicle controller 27 and the lift controller 28 includes various processing and memory components configured to perform the various activities and methods described herein. For example, in some instances, each of the vehicle controller 27 and the lift controller 28 includes a processing circuit having a processor and a memory. The memory is configured to store various instructions configured to, when executed by the processor, cause the vehicle 10 to perform the various activities and methods described herein.

In some embodiments, the vehicle controller 27 may be configured to limit the drive speed of the vehicle 10 depending on a height of the work platform 22. That is, the lift controller 28 may be in communication with a scissor angle sensor 29 configured to monitor a lift angle of the bottom-most support member 25 with respect to the base 12. Based on the lift angle, the lift controller 28 may determine the current height of the work platform 22. Using this height, the vehicle controller 27 may be configured to limit or proportionally reduce the drive speed of the vehicle 10 as the work platform 22 is raised.

Figure 2B:
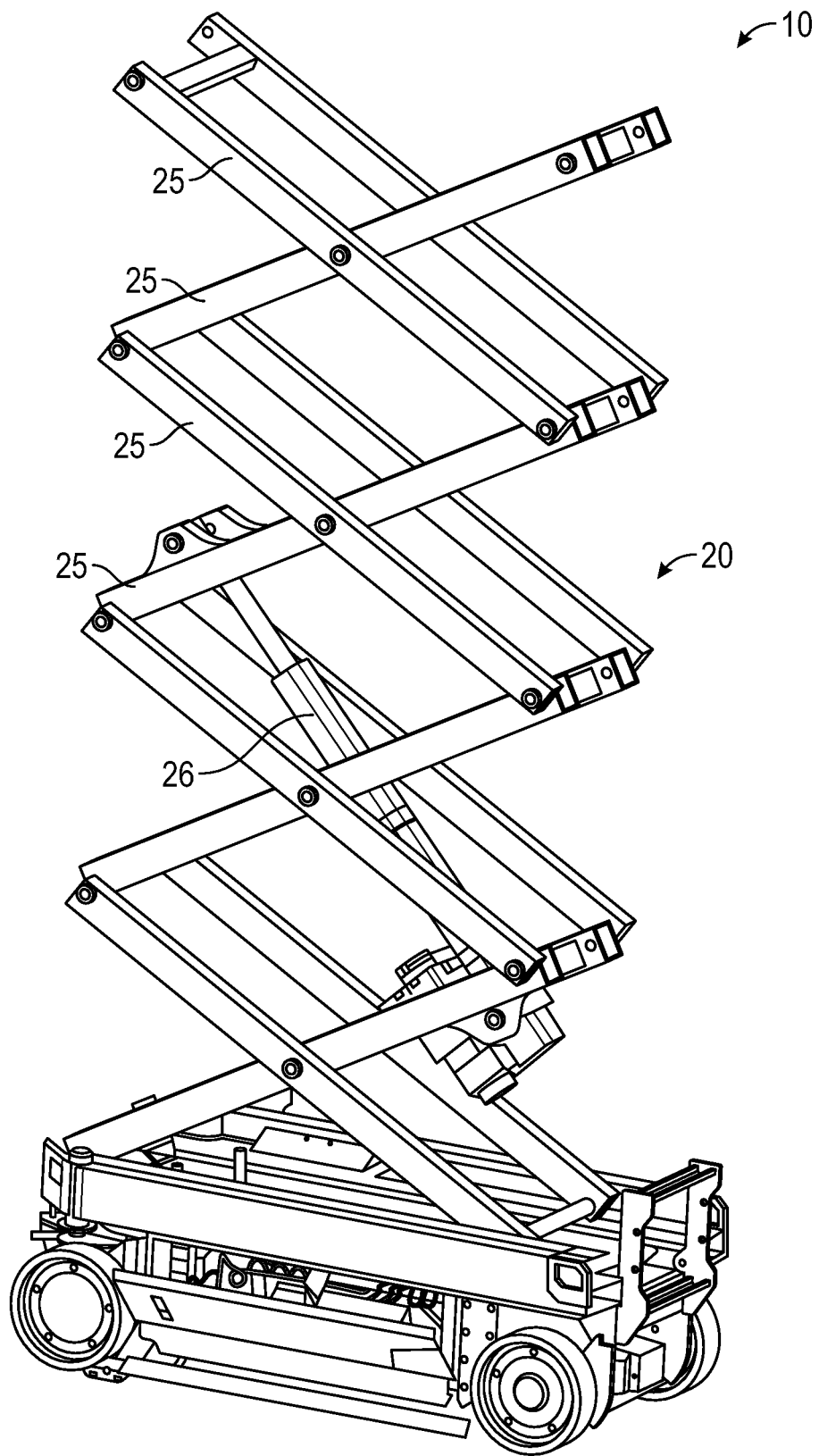
FIG. 2B is a side perspective view of the lift device of FIG. 1A, shown in an extended or work position.
Figure 4:
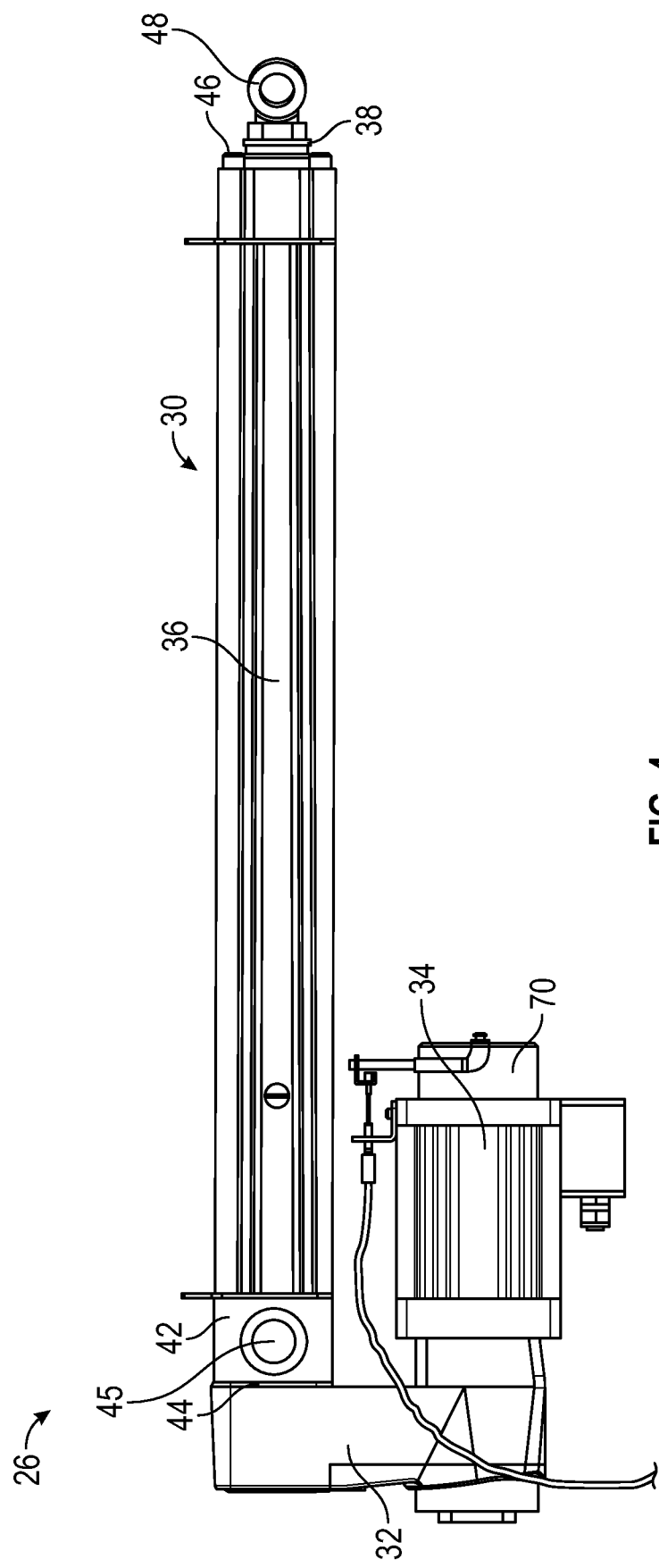
FIG. 4 is a side view of a linear actuator of the lift device of FIG. 1A.
Figure 5:
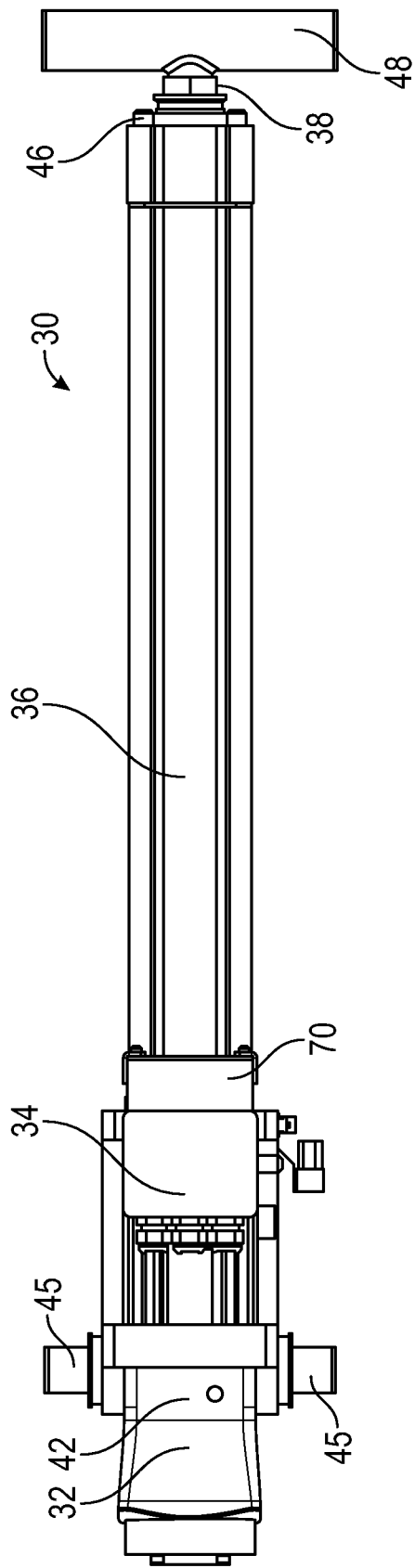
FIG. 5 is a bottom view of the linear actuator of FIG. 4.
Figure 6:
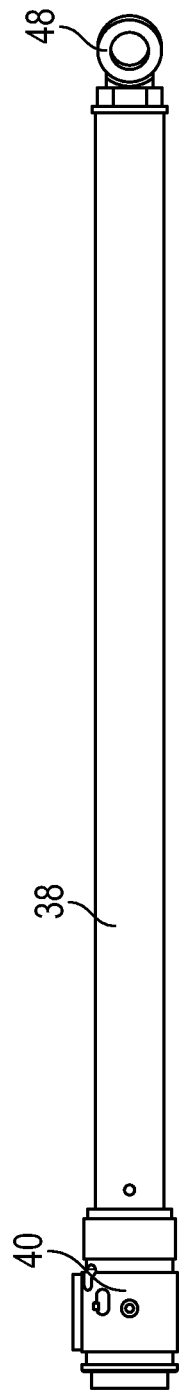
FIG. 6 is a side view of a push tube and a nut assembly of the linear actuator of FIG. 4.

As illustrated in the exemplary embodiment provided in FIGS. 4-6, the linear actuator 26 includes a push tube assembly 30, a gear box 32, and an electric lift motor 34. The push tube assembly 30 includes a protective outer tube 36 (shown in FIGS. 4 and 5), a push tube 38, and a nut assembly 40 (shown in FIG. 6). The protective outer tube 36 has a trunnion connection portion 42 disposed at a proximal end 44 thereof. The trunnion connection portion 42 is rigidly coupled to the gear box 32, thereby rigidly coupling the protective outer tube 36 to the gear box 32. The trunnion connection portion 42 further includes a trunnion mount 45 that is configured to rotatably couple the protective outer tube 36 to one of the support members 25 (as shown in FIG. 2B).

The protective outer tube 36 further includes an opening at a distal end 46 thereof. The opening of the protective outer tube 36 is configured to slidably receive the push tube 38. The push tube 38 includes a connection end, shown as trunnion mount 48, configured to rotatably couple the push tube 38 to another one of the support members 25 (as shown in FIG. 2B). As will be discussed below, the push tube 38 is slidably movable and selectively actuatable between an extended position (shown in FIG. 2B) and a retracted position (shown in FIG. 4).

Referring now to FIG. 6, the push tube 38 is rigidly coupled to the nut assembly 40, such that motion of the nut assembly 40 results in motion of the push tube 38. The push tube 38 and the nut assembly 40 envelop a central screw rod 50 (shown in FIG. 7). The central screw rod 50 is rotatably engaged with the gear box 32 and is configured to rotate within the push tube 38 and the nut assembly 40, about a central axis of the push tube assembly 30. The nut assembly 40 is configured to engage the central screw rod 50 and translate the rotational motion of the central screw rod 50 into translational motion of the push tube 38 and the nut assembly 40, with respect to the central screw rod 50, along the central axis of the push tube assembly 30.

Referring again to FIG. 4, the lift motor 34 is configured to selectively provide rotational actuation to the gear box 32. The rotational actuation from the lift motor 34 is then translated through the gear box 32 to selectively rotate the central screw rod 50 of the push tube assembly 30. Accordingly, the lift motor 34 is configured to provide rotational actuation to the central screw rod 50 via the gear box 32. The rotation of the central screw rod 50 is then translated by the nut assembly 40 to selectively translate the push tube 38 and the nut assembly 40 along the central axis of the push tube assembly 30. Accordingly, the lift motor 34 is configured to selectively actuate the push tube 38 between the extended position and the retracted position. Thus, with the trunnion mount 45 of the protective outer tube 36 and the trunnion mount 48 of the push tube 38 each rotatably coupled to their respective support members 25, the lift motor 34 is configured to selectively move the scissor lift mechanism 20 to various heights between and including the retracted or stowed position and the deployed or work position.

The lift motor 34 may be an AC motor (e.g., synchronous, asynchronous, etc.) or a DC motor (shunt, permanent magnet, series, etc.). In some instances, the lift motor 34 is in communication with and powered by the battery 16. In some other instances, the lift motor 34 may receive electrical power from another electricity source on board the vehicle 10.

Figure 7:
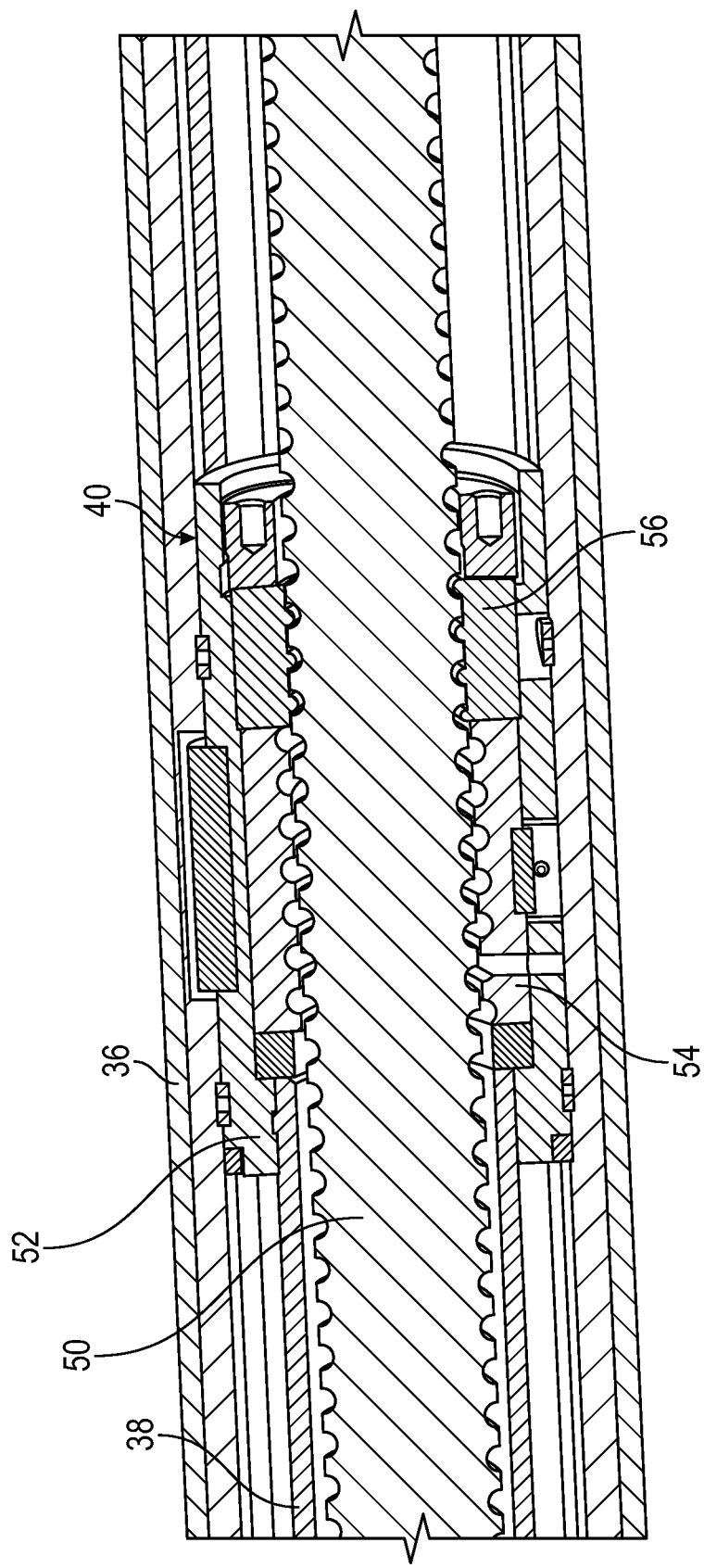
FIG. 7 is a cross-sectional view of the nut assembly of FIG. 6.
Figure 9:
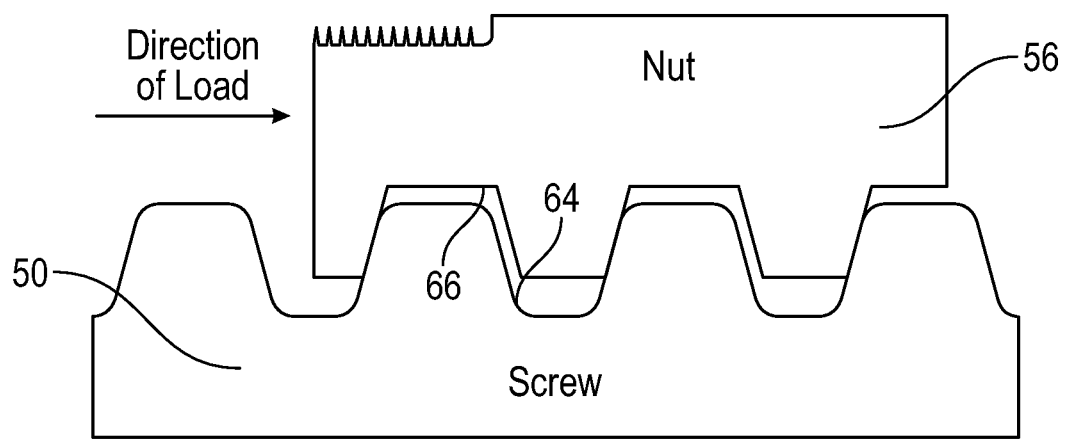
FIG. 9 is a cross-sectional view of a secondary nut mechanism of the nut assembly of FIG. 6.

Referring now to FIGS. 7-9, the nut assembly 40 includes an outer sleeve 52, a primary nut mechanism, shown as ball screw nut 54, and a secondary nut mechanism, shown as a backup jam nut 56. The outer sleeve 52 envelops and is rigidly coupled to both the ball screw nut 54 and the backup jam nut 56. As such, the outer sleeve 52, the ball screw nut 54, and the backup jam nut 56 are configured to move as a unit along the axis of the central screw rod 50.

The ball screw nut 54 is configured to engage the central screw rod 50 and translate the rotational motion of the central screw rod 50 into translational motion of the push tube 38 and the nut assembly 40, with respect to the central screw rod 50, along the central axis of the push tube assembly 30. As best illustrated in FIGS. 8A and 8B, the ball screw nut 54 includes a helical thread 58 and a ball return passageway 60. As depicted in FIG. 8B, a plurality of balls 62 (e.g., ball bearings) are disposed between the helical thread 58 of the ball screw nut 54 and a helical thread 64 of the central screw rod 50. As the central screw rod 50 is rotated, the plurality of balls 62 are configured to roll within the channel formed between the helical threads 58, 64 to gradually move the nut assembly 40 axially with respect to the central screw rod 50, in response to rotation of the central screw rod 50. The ball return passageway 60 allows for the plurality of balls 62 to be continuously recirculated from one axial location on the ball screw nut 54 to another axial location, such that the plurality of balls 62 provide a continuous engagement between the helical threads 58, 64, while minimizing frictional losses between the helical threads 58, 64.

As depicted in FIG. 9, the backup jam nut 56 includes a helical thread 66. In some embodiments, the backup jam nut 56 is an Acme nut. The helical thread 66 is configured to normally be disengaged from the helical thread 64 of the central screw rod 50. Specifically, the fit between the plurality of balls 62 and the helical threads 58, 64 creates a gap between the helical thread 66 of the backup jam nut 56 and the helical thread 64 of the central screw rod 50. As such, under normal operating conditions, the backup jam nut 56 does not contact or otherwise engage the central screw rod 50, and the ball screw nut 54 is the primary nut mechanism.

However, in the event that the ball screw nut 54 fails (e.g., the plurality of balls 62 escape from the channel between the helical threads 58, 64 or the ball screw nut 54 is otherwise damaged), the helical thread 66 of the backup jam nut 56 engages the helical thread 64 of the central screw rod 50, providing a failsafe, backup, or secondary nut mechanism. That is, in the event of a primary nut mechanism failure (e.g., the ball screw nut 54 failing) the secondary nut mechanism (e.g., the backup jam nut 56) is configured to engage the central screw rod 50.

The lift controller 28 is configured to detect a drive power efficiency difference experienced by the lift motor 34 when the ball screw nut 54 is engaged versus when the backup jam nut 56 is engaged. For example, when the ball screw nut 54 is engaged, the lowered frictional losses of the ball screw nut 54 provide a high drive power efficiency of between approximately 80% and approximately 90%. Conversely, when the backup jam nut 56 is engaged, the increased frictional losses of the backup jam nut 56 provide a much lower drive power efficiency of between approximately 20% and approximately 30%. As such, the ball screw nut 54 requires a significantly lower amount of power to run than the backup jam nut 56.

Accordingly, in some instances, the lift controller 28 is configured to monitor drive power efficiency of the linear actuator 26. The lift controller 28 is then configured to compare the monitored drive power efficiency to an expected drive power efficiency to determine whether the ball screw nut 54 is engaged or whether the backup jam nut 56 is engaged. If the lift controller 28 determines that the backup jam nut 56 is engaged, the lift controller 28 may then determine that there has been an actuator failure.

In some embodiments, when the ball screw nut 54 is engaged, if the lift motor 34 is powered down or discharged, the ball screw nut 54 tends to allow the retractable lift mechanism 20 to retract due to gravity. As such, the lift motor 34 includes an electromagnetic brake 70 configured to maintain the position of the work platform 22 when the lift motor 34 is powered down or discharged. Conversely, when the backup jam nut 56 is engaged, the increased frictional forces may maintain the position of the work platform 22 without the electromagnetic brake 70. That is, the work platform 22 having a rated payload may not descend due to gravity. Accordingly, the lift motor 34 may have to actively descend the work platform 22.

In some embodiments, the linear actuator 26 includes various built-in lift characteristic sensors configured to monitor various actuator/motor or lift characteristics. For example, the linear actuator 26 may include a motor speed sensor, a motor torque sensor, various temperature sensors, various vibration sensors, etc. The lift controller 28 may then be in communication with each of these sensors, and may use real-time information received/measured by the sensors to determine whether the primary nut mechanism (e.g., the ball screw nut 54) or the secondary nut mechanism (e.g., the backup jam nut 56) are engaged with the central screw rod 50 (i.e., whether the linear actuator 26 has failed).

For example, in some instances, the lift controller 28 may sense the scissor arm angle using the scissor angle sensor 29 and use the scissor arm angle to determine a height of the work platform 22. The lift controller 28 may then process the height of the work platform 22 through a lookup table to determine a maximum allowable motor torque. The lift controller 28 may then compare the maximum allowable motor torque to a required motor torque to move (e.g., raise or lower) the work platform 22. In some instances, this maximum allowable motor torque and the required torque necessary to move the work platform 22 may be deduced using a maximum allowable current threshold to be applied to the motor and a monitored current being applied to the lift motor 34. If the required motor torque exceeds the maximum allowable motor torque (or the monitored current exceeds the maximum allowable current threshold), the lift controller 28 may indicate that the linear actuator 26 has failed (e.g., that the primary nut mechanism has failed and that the secondary nut mechanism is engaged). The lift controller 28 is then configured to allow for the work platform 22 to be lowered to the stowed or transport position to allow the worker or operator to safely exit the vehicle 10. Once the work platform 22 has been lowered, the lift controller 28 is configured to prevent continued use of the linear actuator 26 until the actuator failure has been repaired (e.g., the nut assembly 40 has been repaired or replaced).

Unlike with traditional hydraulics-based systems, the linear actuator 26 is double-acting. That is, the linear actuator 26 can exert the same magnitude force required to raise the work platform 22 when lowering the work platform 22. Accordingly, if the retractable lift mechanism 20 encounters an obstruction while being lowered, it will exert a force approximately equal to the weight of the work platform 22 plus a rated load. As such, the lift controller 28 may further be configured to monitor the platform height, direction of movement, and actuator torque (current) to avoid structural damage.

Figure 10:
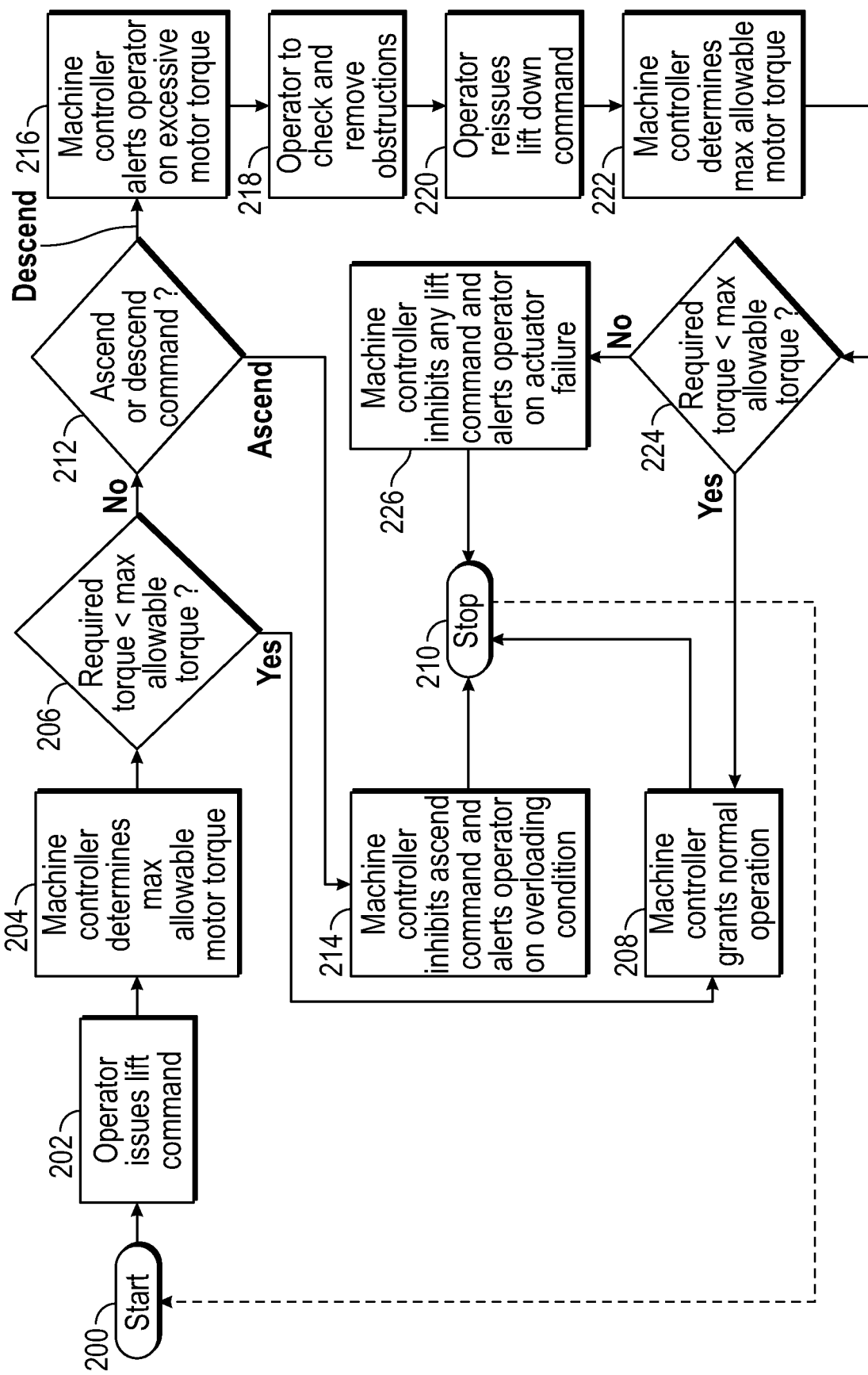
FIG. 10 is a flowchart detailing an exemplary lift process of the lift device of FIG. 1A.

Referring now to FIG. 10, an exemplary flow chart is provided, showing an exemplary method of use for the retractable lift mechanism 20. The process starts at step 200. An operator then issues a lift command at step 202. The machine controller or lift controller 28 then determines the max allowable motor torque, at step 204. As alluded to above, this max allowable motor torque may be determined based on the height of the work platform 22. For example, the lift controller 28 may include a pre-stored torque-height chart or table to be used for the max allowable motor torque determination. The lift controller 28 then decides, at step 206, whether the required torque for the lift motor 34 to lift or lower the work platform 22 is below the maximum allowable torque.

If the lift controller 28 decides, at step 206, that the required torque is below the maximum allowable torque, the lift controller 28 allows the linear actuator 26 to operate normally, at step 208. Once the commanded operation of the linear actuator 26 has been concluded, the linear actuator 26 comes to a stop, at step 210.

If the lift controller 28 decides, at step 206, that the required torque is above the maximum allowable torque, the lift controller 28 then decides whether the work platform 22 is being commanded to ascend or descend, at step 212.

If the lift controller 28 decides, at step 212, that the work platform 22 is being commanded to ascend, the lift controller 28 then inhibits further ascension and alerts the operator regarding the overloading condition, at step 214. The linear actuator 26 then comes to a stop, at step 210.

If the lift controller 28 decides, at step 212, that the work platform 22 is being commanded to descend, the lift controller 28 then alerts the operator regarding the excessive motor torque, at step 216. The operator then checks the surroundings of the vehicle 10 and remove any obstructions, at step 218. The operator then reissues the lift down command, at step 220. The lift controller 28 then again determines the maximum allowable motor torque, at step 222. The lift controller 28 then decides, at step 224, whether the required torque for the lift motor 34 to lower the work platform 22 is below the maximum allowable torque.

If the lift controller 28 decides, at step 224, that the required torque is less than the maximum allowable torque, the lift controller 28 grants the linear actuator 26 normal operation, at step 208. Once the commanded operation of the linear actuator 26 has concluded, the linear actuator 26 comes to a stop, at step 210.

If the lift controller 28 decides, at step 224, that the required torque is more than the maximum allowable torque, the lift controller 28 inhibits any further lift commands and alerts operator to the actuator failure, at step 226. That is, once the operator has made sure there are no obstructions, if the required torque is still higher than the maximum allowable torque, the lift controller 28 may reasonably deduce that there has been an actuator failure. The linear actuator 26 then comes to a stop, at step 210.

The preceding process flow chart is provided as one exemplary embodiment, and is in no way meant to be limiting. The particular order of the process steps may be changed or added to without departing from the scope of this disclosure. For example, in some embodiments, the lift controller 28 may decide whether the work platform 22 is being commanded to ascend or descend prior to determining the maximum allowable torque. Additionally, in some instances, the exemplary flow chart may be cyclical in nature, such that the flow chart returns to the start of the process, at step 200, after the linear actuator 26 is stopped, at step 210 (as indicated by the dashed line).

In some embodiments, the lift controller 28 may additionally monitor or determine the require force or torque needed to lift or lower the work platform 22, and subsequently decide whether the required force is too low or too high to determine actuator failure.

Accordingly, the lift controller 28 is configured to determine if the required torque needed by the lift motor 34 to lift or lower the work platform exceeds a maximum allowed torque, to inhibit further functionality if the maximum allowed torque is exceeded to prevent damage to the vehicle 10 or the surroundings of the vehicle 10, and to alert the operator if the lift actuator is damaged and needs to be replaced. The lift controller 28 may further monitor various lift characteristics to determine if the linear actuator 26 is in an unsafe state (e.g., an actuator failure state or an excessive torque state).

Referring again to FIGS. 1A and 1B, the battery 16 can also supply electrical power to a drive motor 72 to propel the vehicle 10. The drive motor 72 may similarly be an AC motor (e.g., synchronous, asynchronous, etc.) or a DC motor (shunt, permanent magnet, series, etc.) for example, which receives electrical power from the battery 16 or another electricity source on board the vehicle 10 and converts the electrical power into rotational energy in a drive shaft. The drive shaft can be used to drive the wheels 14A, 14B of the vehicle 10 using a transmission. The transmission can receive torque from the drive shaft and subsequently transmit the received torque to a rear axle 74 of the vehicle 10. Rotating the rear axle 74 also rotates the rear wheels 14A on the vehicle 10, which propels the vehicle 10.

The rear wheels 14A of the vehicle 10 can be used to drive the vehicle, while the front wheels 14B can be used to steer the vehicle 10. In some embodiments, the rear wheels 14A are rigidly coupled to the rear axle 74, and are held in a constant orientation relative to the base 12 of the vehicle 10 (e.g., approximately aligned with an outer perimeter 76 of the vehicle 10). In contrast, the front wheels 14B are pivotally coupled to the base 12 of the vehicle 10. The wheels 14B can be rotated relative to the base 12 to adjust a direction of travel for the vehicle 10. Specifically, the front wheels 14B can be oriented using an electrical steering system 78. In some embodiments, the steering system 78 may be completely electrical in nature, and may not include any form of hydraulics.

Figure 11:
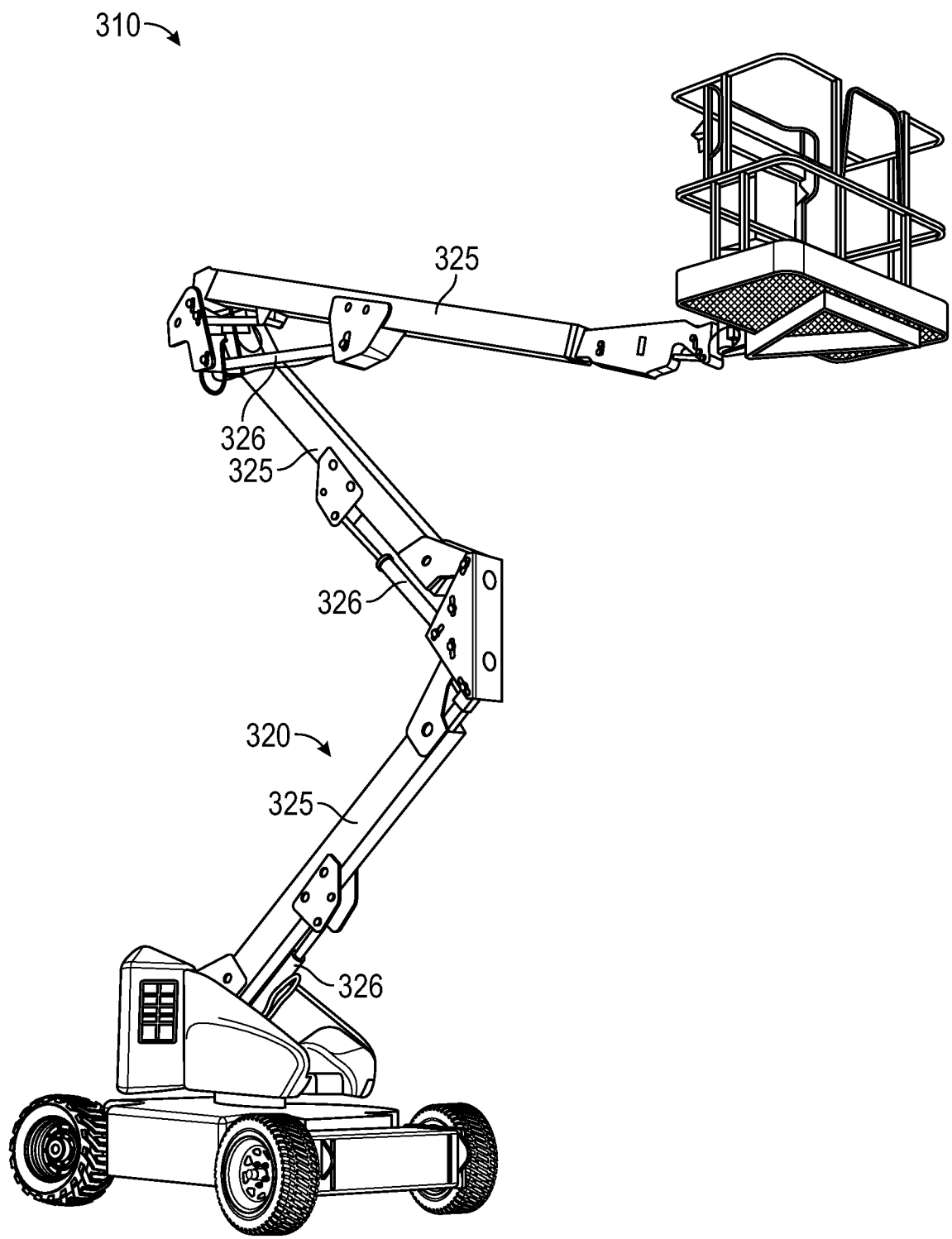
FIG. 11 is a side perspective view of another lift device in the form of a boom lift, according to another exemplary embodiment.

It should be appreciated that, while the retractable lift mechanism included on vehicle 10 is a scissor lift mechanism, in some instances, a vehicle may be provided that alternatively includes a retractable lift mechanism in the form of a boom lift mechanism. For example, in the exemplary embodiment depicted in FIG. 11, a vehicle, shown as vehicle 310, is illustrated. The vehicle 310 includes a retractable lift mechanism, shown as boom lift mechanism 320. The boom lift mechanism 320 is similarly formed of a series of linked, foldable support members 325. The boom lift mechanism 320 is selectively movable between a retracted or stowed position and a deployed or work position using a plurality of actuators 326. Each of the plurality of actuators 326 is a linear actuator similar to the linear actuator 26.

It should be further appreciated that the linear actuators used in the lift mechanism 20, 320, as well as in the steering system 78, may be incorporated into nearly any type of electric vehicle. For example, the electric systems described herein can be incorporated into, for example, a scissor lift, an articulated boom, a telescopic boom, or any other type of aerial work platform.

Additionally, although the depicted nut assembly 40 utilizes a primary nut mechanism in the form of the ball screw nut 54, in some embodiments, the primary nut mechanism may alternatively be a roller screw nut. In some other embodiments, the primary nut mechanism may be any other suitable nut for translating rotational motion of the central screw rod 50 into translational motion of the push tube 38 and the nut assembly 40.

Advantageously, vehicles 10, 310 may be fully-electric lift devices. All of the electric actuators and electric motors of vehicles 10, 310 can be configured to perform their respective operations without requiring any hydraulic systems, hydraulic reservoir tanks, hydraulic fluids, engine systems, etc. That is, both vehicles 10, 310 may be completely devoid of any hydraulic systems and/or hydraulic fluids generally. Said differently, both vehicles 10, 310 may be devoid of any moving fluids. Traditional lift device vehicles do not use a fully-electric system and require regular maintenance to ensure that the various hydraulic systems are operating properly. As such, the vehicles 10, 310 may use electric motors and electric actuators, which allows for the absence of combustible fuels (e.g., gasoline, diesel)

and/or hydraulic fluids. As such, the vehicles 10, 310 may be powered by batteries, such as battery 16, that can be recharged when necessary.

Figure 12A:
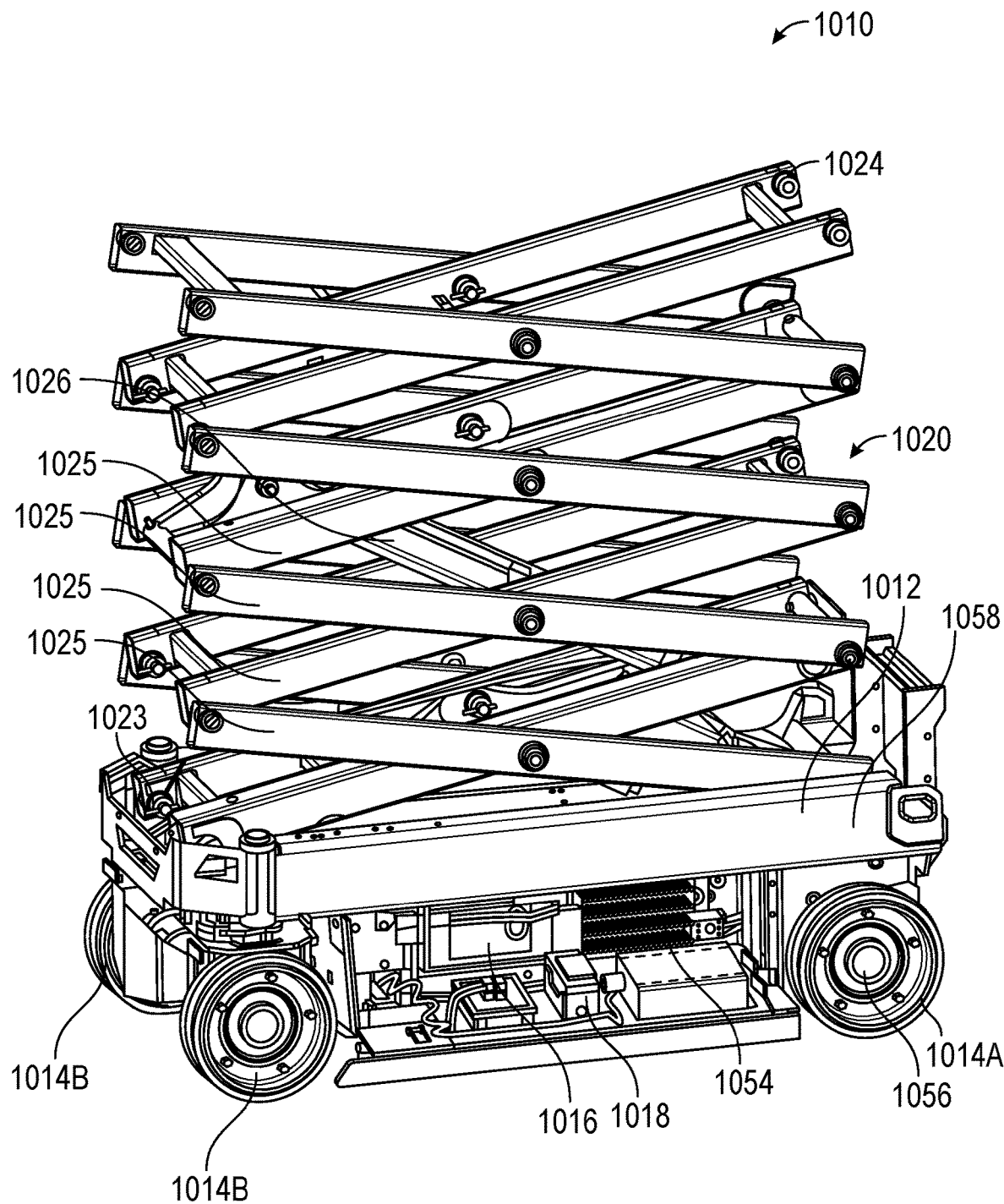
FIG. 12A is a side perspective view of a lift device in the form of a scissor lift, according to an exemplary embodiment.
Figure 12B:
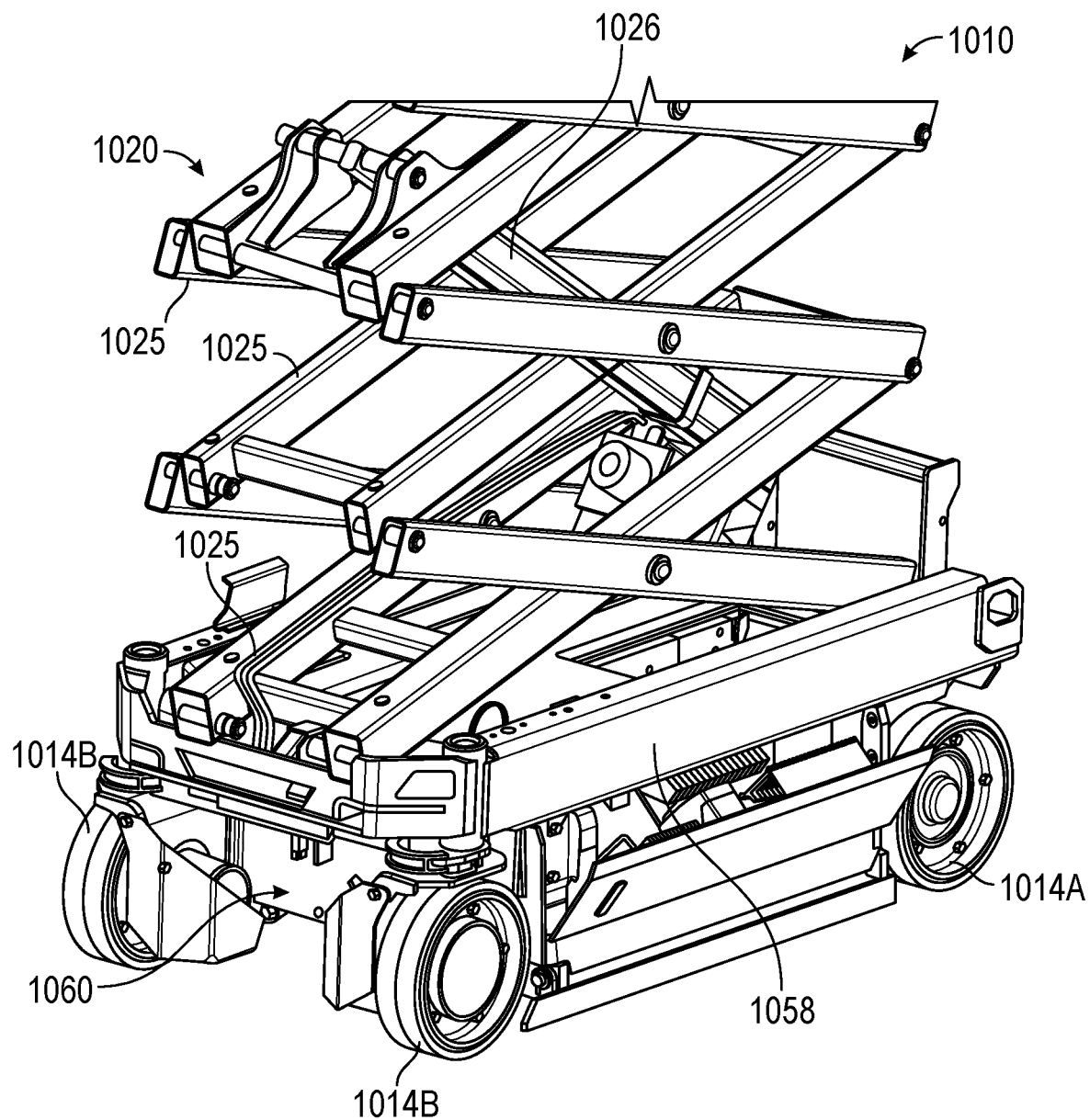
FIG. 12B is another side perspective view of the lift device of FIG. 1A.

According to the exemplary embodiment depicted in FIGS. 12A and 12B, a vehicle, shown as vehicle 1010, is illustrated. The vehicle 1010 may be a scissor lift, for example, which can be used to perform a variety of different tasks at various elevations. The vehicle 1010 includes a base 1012 supported by wheels 1014A, 1014B positioned about the base 1012. The vehicle 1010 further includes a battery 1016 positioned on board the base 1012 of the vehicle 1010 to supply electrical power to various operating systems present on the vehicle 1010.

The battery 1016 can be a rechargeable lithium-ion battery, for example, which is capable of supplying a direct current (DC) or alternating current (AC) to vehicle 1010 controls, motors, actuators, and the like. The battery 1016 can include at least one input 1018 capable of receiving electrical current to recharge the battery 1016. In some embodiments, the input 1018 is a port capable of receiving a plug in electrical communication with an external power source, like a wall outlet. The battery 1016 can be configured to receive and store electrical current from one of a traditional 120 V outlet, a 240 V outlet, a 480 V outlet, an electrical power generator, or another suitable electrical power source.

Figure 13A:
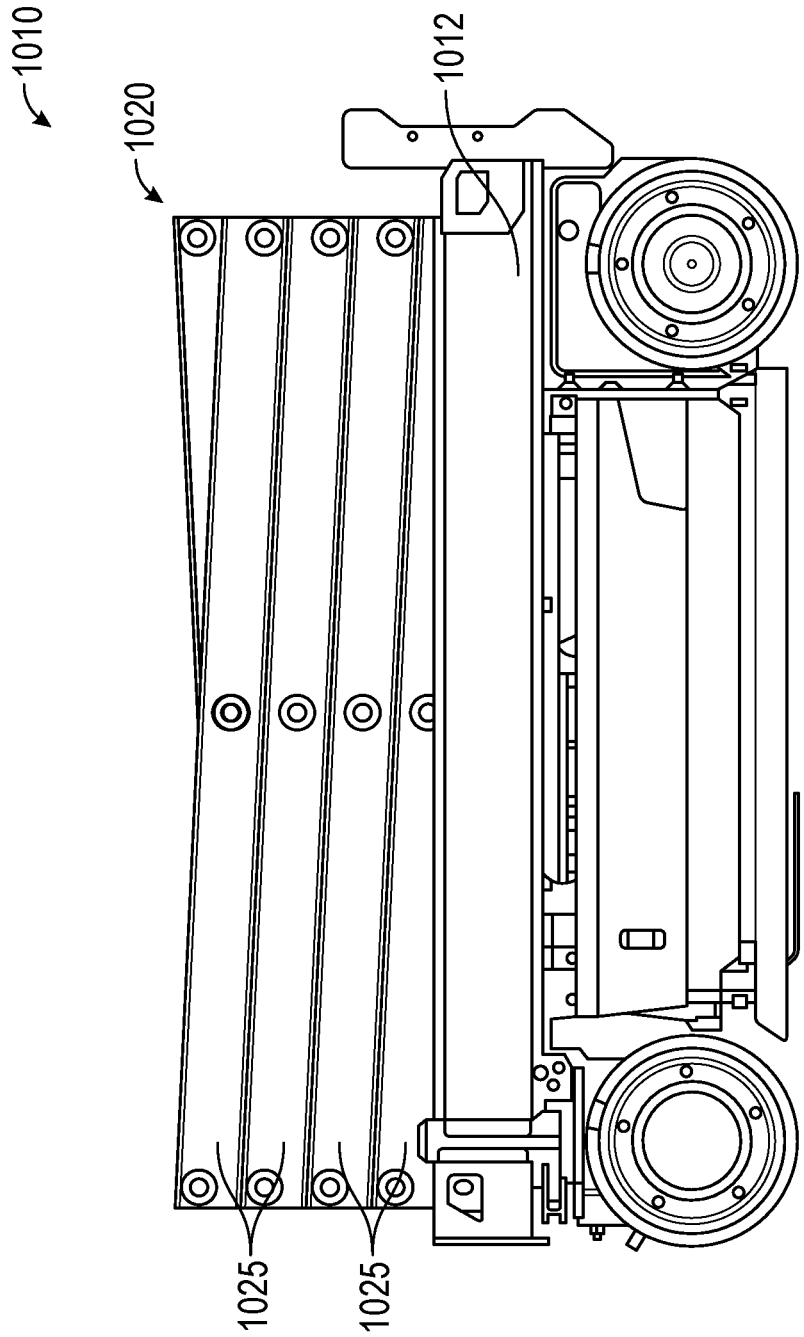
FIG. 13A is a side view of the lift device of FIG. 1A, shown in a retracted or stowed position.

The vehicle 1010 further includes a retractable lift mechanism, shown as a scissor lift mechanism 1020, coupled to the base 1012. The scissor lift mechanism 1020 supports a work platform 1022 (shown in FIG. 14). As depicted, a first end 1023 of the scissor lift mechanism 1020 is anchored to the base 1012, while a second end 1024 of the scissor lift mechanism 1020 supports the work platform 1022. As illustrated, the scissor lift mechanism 1020 is formed of a foldable series of linked support members 1025. The scissor lift mechanism 1020 is selectively movable between a retracted or stowed position (shown in FIG. 13A) and a deployed or work position (shown in FIG. 13B) using an actuator, shown as linear actuator 1026. The linear actuator 1026 is an electric actuator. The linear actuator 1026 controls the orientation of the scissor lift mechanism 1020 by selectively applying force to the scissor lift mechanism 1020. When a sufficient force is applied to the scissor lift mechanism 1020 by the linear actuator 1026, the scissor lift mechanism 1020 unfolds or otherwise deploys from the stowed or retracted position into the work position. Because the work platform 1022 is coupled to the scissor lift mechanism 1020, the work platform 1022 is also raised away from the base 1012 in response to the deployment of the scissor lift mechanism 1020.

Figure 14:
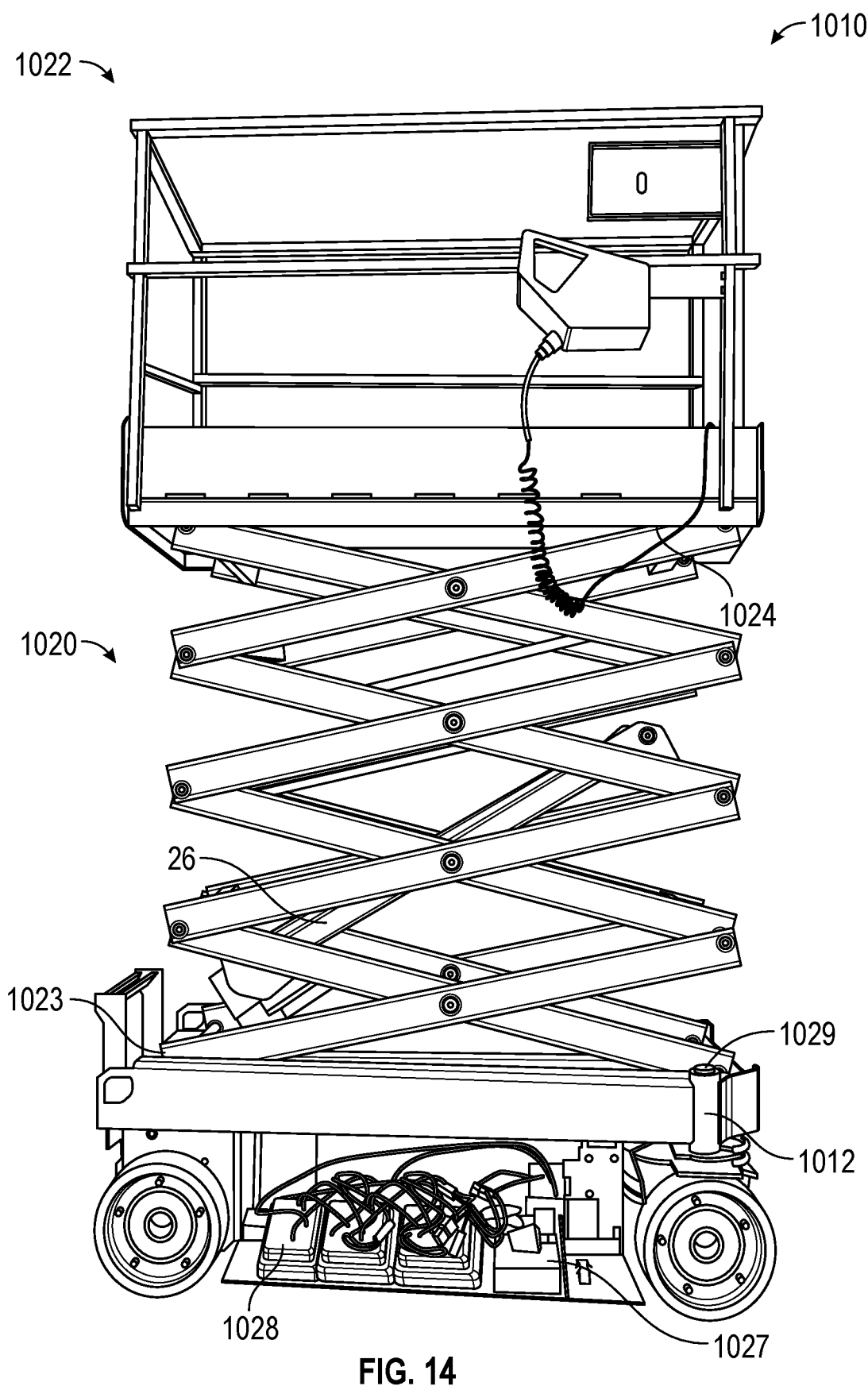
FIG. 14 is a side view of the lift device of FIG. 1A, depicting various vehicle controllers.

As shown in FIG. 14, the vehicle 1010 further includes a vehicle controller 1027 and a lift controller 1028. The vehicle controller 1027 is in communication with the lift controller 1028. The lift controller 1028 is in communication with the linear actuator 1026 to control the movement of the scissor lift mechanism 1020. Communication between the lift controller 1028 and the linear actuator 1026 and/or between the vehicle controller 1027 and the lift controller 1028 can be provided through a hardwired connection, or through a wireless connection (e.g., Bluetooth, Internet, cloud-based communication system, etc.). It should be understood that each of the vehicle controller 1027 and the lift controller 1028 includes various processing and memory components configured to perform the various activities and methods described herein. For example, in some instances, each of the vehicle controller 1027 and the lift controller 1028 includes a processing circuit having a processor and a memory. The memory is configured to store various instructions configured to, when executed by the processor, cause the vehicle 1010 to perform the various activities and methods described herein.

In some embodiments, the vehicle controller 1027 may be configured to limit the drive speed of the vehicle 1010 depending on a height of the work platform 1022. That is, the lift controller 1028 may be in communication with a scissor angle sensor 1029 configured to monitor a lift angle of the bottom-most support member 1025 with respect to the base 1012. Based on the lift angle, the lift controller 1028 may determine the current height of the work platform 1022. Using this height, the vehicle controller 1027 may be configured to limit or proportionally reduce the drive speed of the vehicle 1010 as the work platform 1022 is raised.

Figure 13B:
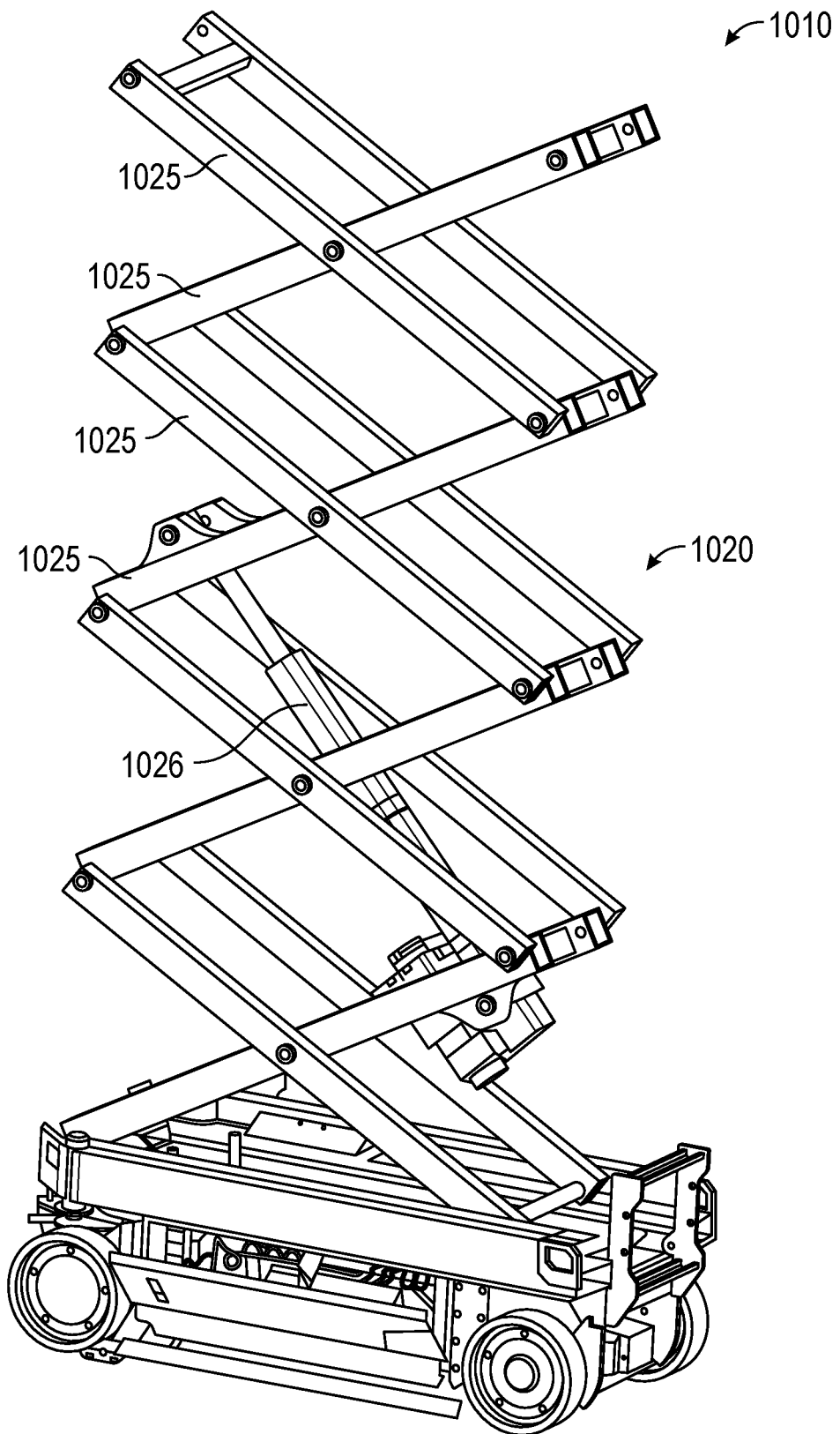
FIG. 13B is a side perspective view of the lift device of FIG. 1A, shown in an extended or work position.
Figure 15:
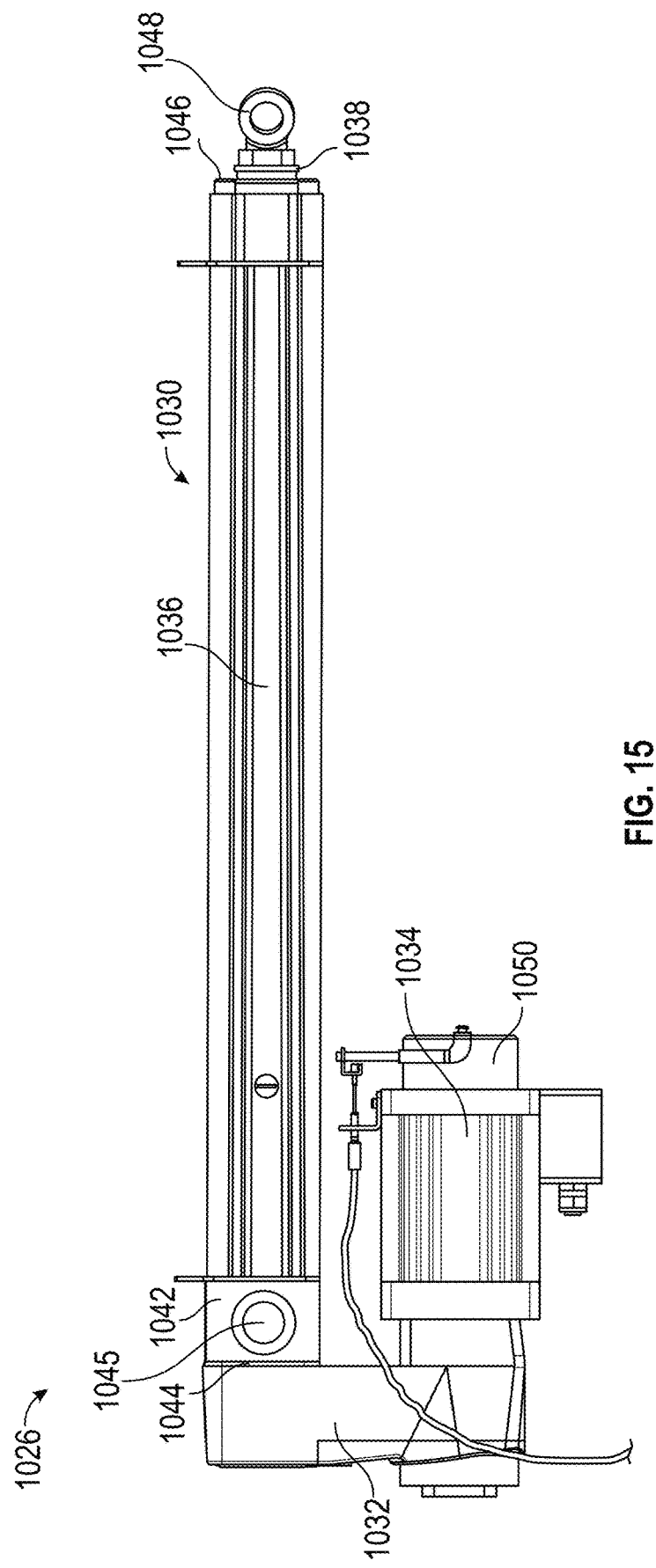
FIG. 15 is a side view of a linear actuator of the lift device of FIG. 1A.
Figure 16:
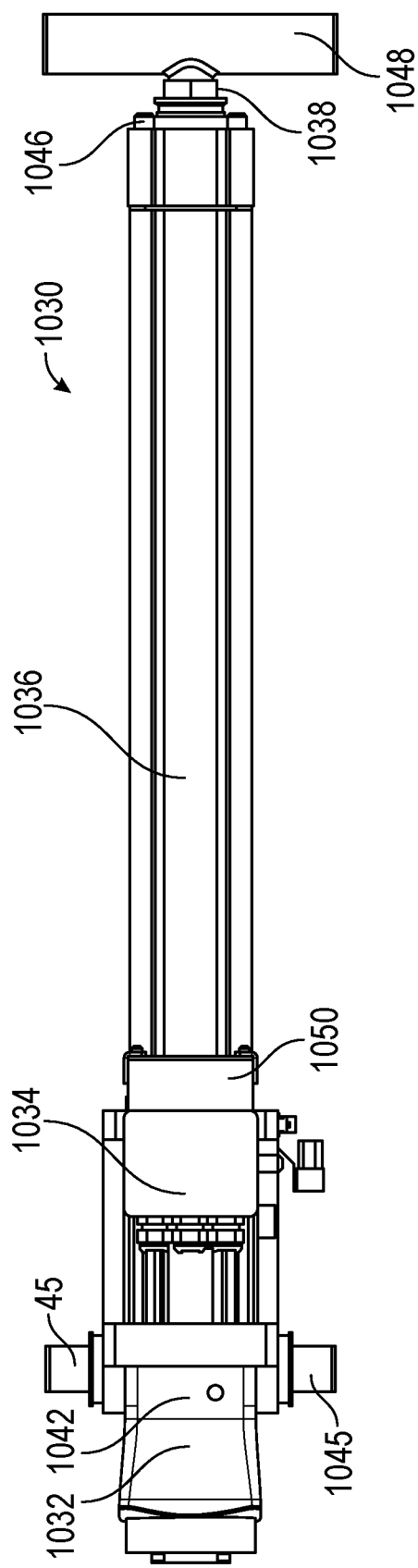
FIG. 16 is a bottom view of the linear actuator of FIG. 4.
Figure 17:
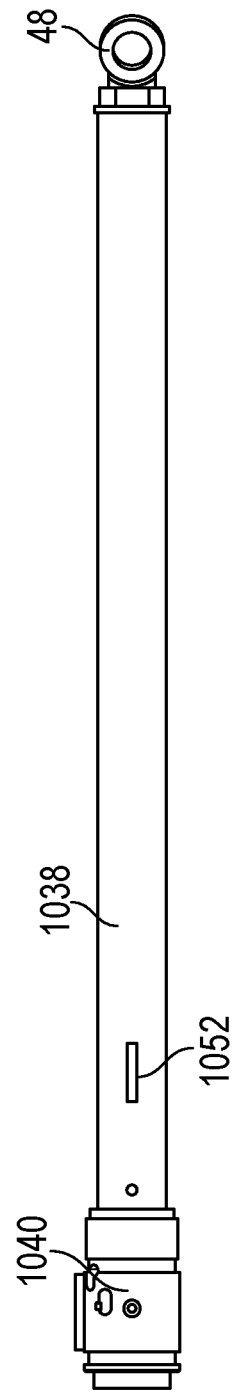
FIG. 17 is a side view of a push tube and a nut assembly of the linear actuator of FIG. 4.

As illustrated in the exemplary embodiment provided in FIGS. 15-17, the linear actuator 1026 includes a push tube assembly 1030, a gear box 1032, and an electric lift motor 1034. The push tube assembly 1030 includes a protective outer tube 1036 (shown in FIGS. 4 and 5), an inner push tube 1038, and a nut assembly 1040 (shown in FIG. 17). The protective outer tube 1036 has a trunnion connection portion 1042 disposed at a proximal end 1044 thereof. The trunnion connection portion 1042 is rigidly coupled to the gear box 1032, thereby rigidly coupling the protective outer tube 1036 to the gear box 1032. The trunnion connection portion 1042 further includes a trunnion mount 1045 that is configured to rotatably couple the protective outer tube 1036 to one of the support members 1025 (as shown in FIG. 13B).

The protective outer tube 1036 further includes an opening at a distal end 1046 thereof. The opening of the protective outer tube 1036 is configured to slidably receive the inner push tube 1038. The inner push tube 1038 includes a connection end, shown as trunnion mount 1048, configured to rotatably couple the inner push tube 1038 to another one of the support members 1025 (as shown in FIG. 13B). As will be discussed below, the inner push tube 1038 is slidably movable and selectively actuatable between an extended position (shown in FIG. 13B) and a retracted position (shown in FIG. 15).

Referring now to FIG. 6, the inner push tube 1038 is rigidly coupled to the nut assembly 1040, such that motion of the nut assembly 1040 results in motion of the inner push tube 1038. The inner push tube 1038 and the nut assembly 1040 envelop a central screw rod. The central screw rod is rotatably engaged with the gear box 1032 and is configured to rotate within the inner push tube 1038 and the nut assembly 1040, about a central axis of the push tube assembly 1030. The nut assembly 1040 is configured to engage the central screw rod and translate the rotational motion of the central screw rod into translational motion of the inner push tube 1038 and the nut assembly 1040, with respect to the central screw rod, along the central axis of the push tube assembly 1030.

Referring again to FIG. 15, the lift motor 1034 is configured to selectively provide rotational actuation to the gear box 1032. The rotational actuation from the lift motor 1034 is then translated through the gear box 1032 to selectively rotate the central screw rod of the push tube assembly 1030. The rotation of the central screw rod is then translated by the nut assembly 1040 to selectively translate the inner push tube 1038 and the nut assembly 1040 along the central axis of the push tube assembly 1030. Accordingly, the lift motor 1034 is configured to selectively actuate the inner push tube 1038 between the extended position and the retracted position. Thus, with the trunnion mount 1045 of the protective outer tube 1036 and the trunnion mount 1048 of the inner push tube 1038 each rotatably coupled to their respective support members 1025, the lift motor 1034 is configured to selectively move the scissor lift mechanism 1020 to various heights between and including the retracted or stowed position and the deployed or work position.

In some embodiments, the nut assembly 1040 may be a ball screw nut assembly. In some other embodiments, the nut assembly 1040 may be a roller screw nut assembly. In some yet some other embodiments, the nut assembly 1040 may be any other suitable nut assembly configured to translate the rotational motion of the central screw rod into axial movement of the inner push tube 1038 and the nut assembly 1040.

When the lift motor 1034 is powered down or discharged, the nut assembly 1040 allows the scissor lift mechanism 1020 to gradually retract due to gravity. As such, the lift motor 1034 includes an electromagnetic brake 1050 configured to maintain the position of the work platform 1022 when the lift motor 1034 is powered down or discharged. In some instances, the electromagnetic brake 1050 is further configured to aid the lift motor 1034 in maintaining the position of the work platform 1022 during normal operation.

The lift motor 1034 may be an AC motor (e.g., synchronous, asynchronous, etc.) or a DC motor (shunt, permanent magnet, series, etc.). In some instances, the lift motor 1034 is in communication with and powered by the battery 1016. In some other instances, the lift motor 1034 may receive electrical power from another electricity source on board the vehicle 1010.

In some embodiments, the linear actuator 1026 includes various built-in sensors configured to monitor various actuator/motor characteristics. For example, the linear actuator 1026 may include a motor speed sensor, a motor torque sensor (e.g., a motor current sensor), various temperature sensors, various vibration sensors, etc. The lift controller 1028 may then be in communication with each of these sensors, and may use real-time information received/measured by the sensors to determine a load held by the work platform 1022.

In some embodiments, to determine the load held by the work platform 1022, the lift controller 1028 may temporarily disengage the electromagnetic brake 1050 and maintain the height of the work platform 1022 using the lift motor 1034. As alluded to above, in some instances, the electromagnetic brake 1050 is configured to aid the lift motor in maintaining the position of the work platform 1022 during normal operation. By disengaging the electromagnetic brake 1050, the full load on the work platform 1022 must be supported using the lift motor 1034. With the full load on the work platform 1022 being supported by the lift motor 1034, the lift controller 1028 may then determine, based on the various actuator/motor characteristics, the load on the work platform 1022. In some instances, the electromagnetic brake 1050 may be disengaged for less than five seconds. In some instances, the electromagnetic brake 1050 may be disengaged for less than one second.

Figure 18:
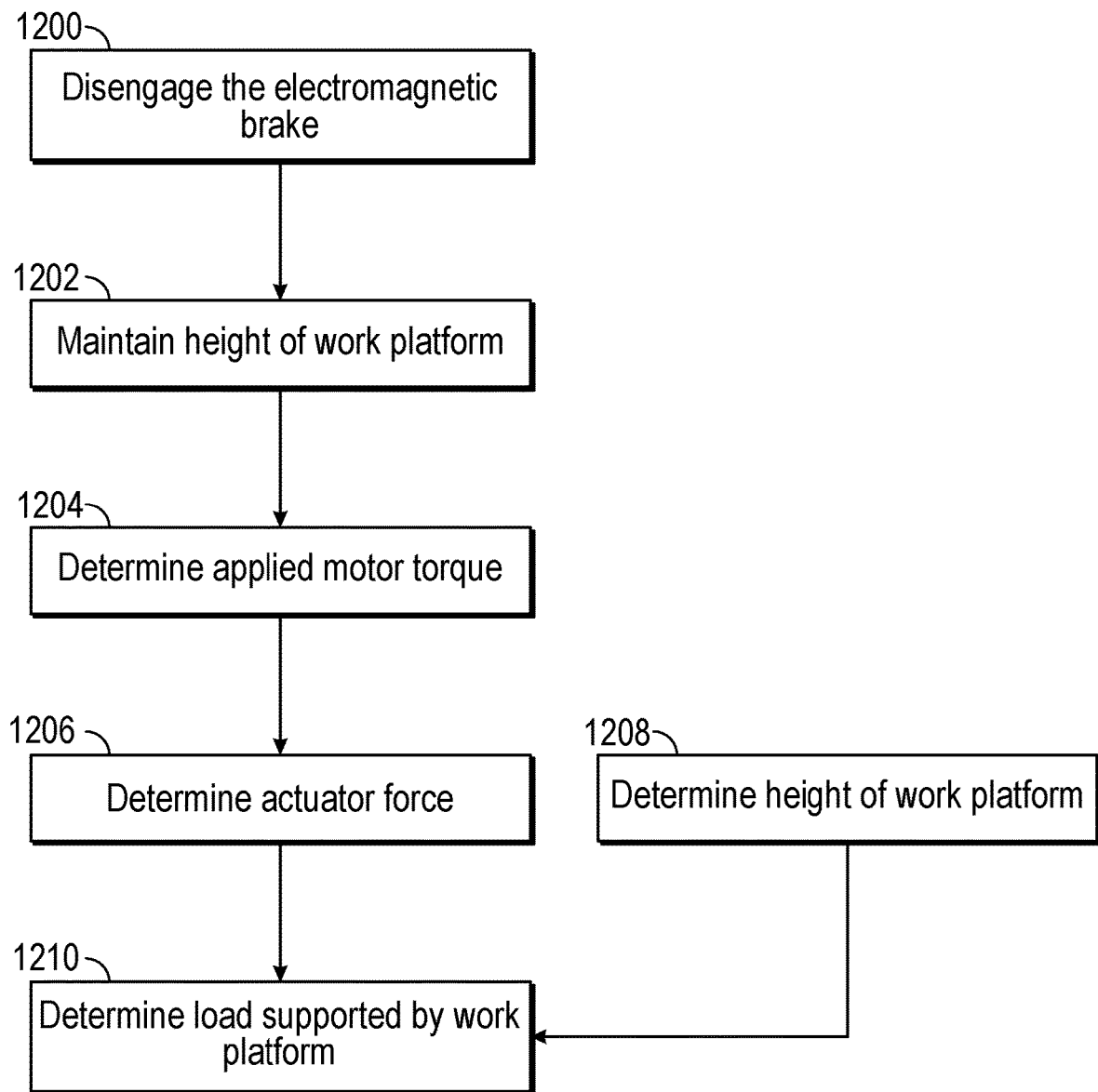
FIG. 18 is a flow chart of an exemplary method of determining a load supported by a work platform of the lift device of FIG. 3.

For example, referring now to FIG. 18, a flow chart is provided, showing an exemplary method of determining the load on the work platform 1022. As depicted, the lift controller 1028 may first disengage the electromagnetic brake 1050, at step 1200. The lift controller 1028 may then maintain the height of the work platform 1022 using the lift motor 1034, at step 1202.

With the electromagnetic brake 1050 disengaged and the lift motor 1034 maintaining the height of the work platform 1022, the lift controller 1028 may determine the applied motor torque output by the lift motor 1034, at step 1204, using a combination of the measured motor current of the lift motor 1034, the measured motor slip of the lift motor 1034, and various other motor characteristics associated with the lift motor 1034 (e.g., motor type, winding density of a coil of the lift motor 1034, winding material of the coil of the lift motor 1034, etc.). The lift controller 1028 may then use the applied motor torque and a model of the mechanics of the linear actuator 1026 to determine an actuator force applied by the linear actuator 1026 on the scissor lift mechanism 1020, at step 1206.

Before, during, or after determining the actuator force applied by the linear actuator 1026, the lift controller 1028 may determine a height of the work platform 1022, at step 1208, using the lift angle sensed by the scissor angle sensor 1029 and a model of the mechanics of the scissor lift mechanism 1020. The lift controller 1028 may then determine the load supported by the work platform 1022, at step 1210, using the applied actuator force, the platform height, and a height-force curve for the scissor lift mechanism 1020.

In some exemplary embodiments, a strain gauge 1052 (shown in FIG. 17) may be coupled to the inner push tube 1038 to monitor a compression of the inner push tube 1038 during operation (e.g., along the axial length of the inner push tube). The lift controller 1028 may be in communication with the strain gauge 1052. Accordingly, the lift controller 1028 may additionally or alternatively use the monitored compression of the inner push tube 1038, various dimensional characteristics of the inner push tube 1038 (e.g., length, diameter, thickness, etc.), and the material properties of the inner push tube 1038 (e.g., Young's modulus) to determine the load supported by the inner push tube 1038, and thereby the load supported by the work platform 1022.

In some embodiments, the lift controller 1028 may be configured to limit or scale the lifting functions of the scissor lift mechanism 1020 based on the determined load supported by the work platform 1022. For example, in some instances, the lift controller 1028 may limit or scale the lifting functions when the load supported by the work platform is between 100% and 120% of a rated capacity of the vehicle 1010. For example, between 100% and 120% of the rated capacity, the lift speed (raising or lowering) of the linear actuator 1026 may be reduced (e.g., 20%, 50%, 75% of normal operation speed).

Referring again to FIGS. 12A and 12B, the battery 1016 can also supply electrical power to a drive motor 1054 to propel the vehicle 1010. The drive motor 1054 may similarly be an AC motor (e.g., synchronous, asynchronous, etc.) or a DC motor (shunt, permanent magnet, series, etc.) for example, which receives electrical power from the battery 1016 or another electricity source on board the vehicle 1010 and converts the electrical power into rotational energy in a drive shaft. The drive shaft can be used to drive the wheels 1014A, 1014B of the vehicle 1010 using a transmission. The transmission can receive torque from the drive shaft and subsequently transmit the received torque to a rear axle 1056 of the vehicle 1010. Rotating the rear axle 1056 also rotates the rear wheels 1014A on the vehicle 1010, which propels the vehicle 1010.

The rear wheels 1014A of the vehicle 1010 can be used to drive the vehicle, while the front wheels 1014B can be used to steer the vehicle 1010. In some embodiments, the rear wheels 1014A are rigidly coupled to the rear axle 1056, and are held in a constant orientation relative to the base 1012 of the vehicle 1010 (e.g., approximately aligned with an outer perimeter 1058 of the vehicle 1010). In contrast, the front wheels 1014B are pivotally coupled to the base 1012 of the vehicle 1010. The wheels 1014B can be rotated relative to the base 1012 to adjust a direction of travel for the vehicle

1010. Specifically, the front wheels 1014B can be oriented using an electrical steering system 1060. In some embodiments, the steering system 1060 may be completely electrical in nature, and may not include any form of hydraulics.

Figure 19:
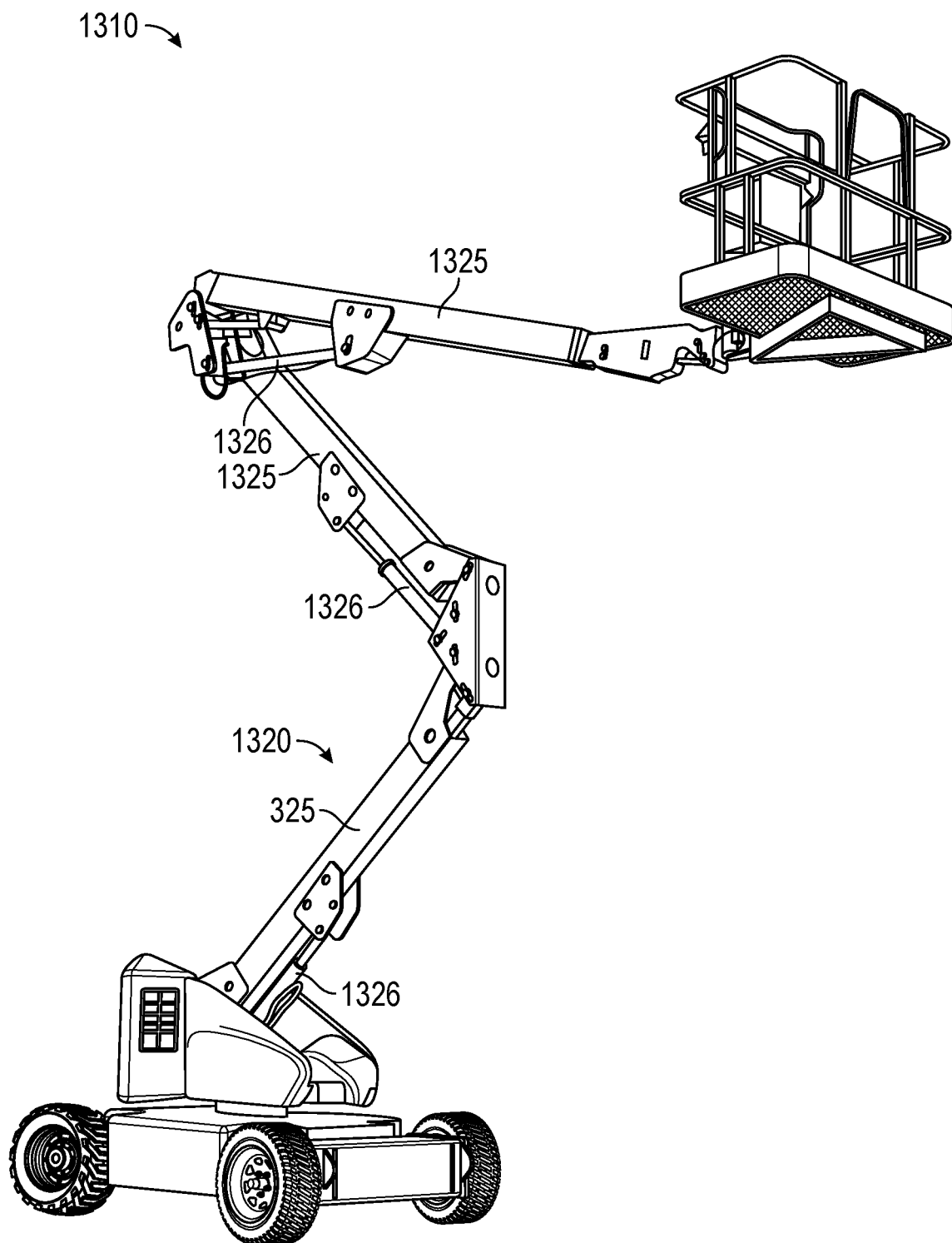
FIG. 19 is a side perspective view of another lift device in the form of a boom lift, according to another exemplary embodiment.

It should be appreciated that, while the retractable lift mechanism included on vehicle 1010 is a scissor lift mechanism, in some instances, a vehicle may be provided that alternatively includes a retractable lift mechanism in the form of a boom lift mechanism. For example, in the exemplary embodiment depicted in FIG. 19, a vehicle, shown as vehicle 1310, is illustrated. The vehicle 1310 includes a retractable lift mechanism, shown as boom lift mechanism 1320. The boom lift mechanism 1320 is similarly formed of a foldable series of linked support members 1325. The boom lift mechanism 1320 is selectively movable between a retracted or stowed position and a deployed or work position using a plurality of actuators 1326. Each of the plurality of actuators 1326 is a linear actuator similar to the linear actuator 1026.

It should be further appreciated that the linear actuators 1026, 1326 used in the lift mechanisms 1020, 1320, as well as in the steering system 1060, may be incorporated into nearly any type of electric vehicle. For example, the electric systems described herein can be incorporated into, for example, a scissor lift, an articulated boom, a telescopic boom, or any other type of aerial work platform.

Advantageously, vehicles 1010, 1310 may be fully-electric lift devices. All of the electric actuators and electric motors of vehicles 1010, 1310 can be configured to perform their respective operations without requiring any hydraulic systems, hydraulic reservoir tanks, hydraulic fluids, engine systems, etc. That is, both vehicles 1010, 1310 may be completely devoid of any hydraulic systems and/or hydraulic fluids generally. Said differently, both vehicles 1010, 1310 may be devoid of any moving fluids. Traditional lift device vehicles do not use a fully-electric system and require regular maintenance to ensure that the various hydraulic systems are operating properly. As such, the vehicles 1010, 1310 may use electric motors and electric actuators, which allows for the absence of combustible fuels (e.g., gasoline, diesel) and/or hydraulic fluids. As such, the vehicles 1010, 1310 may be powered by batteries, such as battery 1016, that can be re-charged when necessary.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is coupled to the processor to form a processing circuit and includes computer code for executing (e.g., by the processor) the one or more processes described herein.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A scissor lift, comprising:
    a base;
    a platform configured to support a load;
    a lift assembly having a first end coupled to the base and a second end coupled to the platform, the lift assembly including a plurality of support members that are pivotally coupled to one another; and
    a linear actuator coupled to the lift assembly and configured to extend to raise the platform relative to the base, the linear actuator including:
        a screw;
        a nut engaging the screw;
        an electric motor configured to drive rotation of the screw relative to the nut to control extension of the linear actuator;
        a housing coupled to the electric motor and rotatably coupled to the screw wherein the housing includes a first end and an opposing second end; and
        a push tube coupled to the nut and slidably received within the first end of the housing, wherein the push tube includes a first mount coupled to a first support member of the plurality of support members and the housing includes a second mount coupled to a second support member of the plurality of support members, and wherein the second mount is offset from the second end of the housing.

2. The scissor lift of claim 1, wherein the plurality of support members includes a first support member and a second support member, wherein the linear actuator has a first end coupled to the first support member, and wherein the linear actuator has a second end coupled to the second support member.

3. The scissor lift of claim 1, wherein the plurality of support members includes (a) a pair of first support members coupled to the base and pivotally coupled to one another and (b) a pair of second support members coupled to the platform and pivotally coupled to one another.

4. The scissor lift of claim 1, further comprising a plurality of wheels coupled to the base.

5. The scissor lift of claim 1, further comprising a battery coupled to the base and electrically coupled to the electric motor.

6. The scissor lift of claim 1, wherein the housing includes an elongated member that receives the extending member.

7. The scissor lift of claim 6, wherein the push tube extends between the screw and the elongated member in at least one position of the linear actuator.

8. The scissor lift of claim 6, wherein the extending member is configured to move relative to the housing along an axis of extension, and wherein the extending member and the elongated member are substantially centered about the axis of extension.

9. The scissor lift of claim 8, wherein the electric motor extends substantially parallel to the axis of extension, and wherein the electric motor is offset from the axis of extension.

10. The scissor lift of claim 1, wherein the first mount defines a mount aperture that extends through the first mount substantially perpendicular to the push tube.

11. The scissor lift of claim 10, wherein the mount aperture extends laterally through the first mount from a first side of the first mount to an opposing second side of the first mount.

12. The scissor lift of claim 1, wherein the linear actuator further includes a secondary nut engaging the screw.

13. The scissor lift of claim 1, wherein the second mount is arranged axially between a gearbox of the linear actuator and the second mount, and wherein the second mount includes a pair of trunnion rod protrusions that extend laterally outwardly in opposing directions.

14. A scissor lift, comprising:
    a base;
    a platform configured to support a load;
    a lift assembly having a first end coupled to the base and a second end coupled to the platform, the lift assembly including a plurality of support members pivotally coupled to one another; and
    a linear actuator coupled to the lift assembly, the linear actuator including:
        a gearbox;
        a housing defining a passage and including an outer tube, the housing being coupled to a first support member of the plurality of support members by a trunnion mount, wherein the trunnion mount is arranged between the gearbox and the outer tube;
        a screw coupled to the housing;
        a push tube slidably received within the passage, the push tube being coupled to a second support member of the plurality of support members; and
        an electric motor coupled to the housing and configured to drive the screw to move the push tube relative to the housing.

15. The scissor lift of claim 14, wherein the gearbox couples the electric motor to the screw, wherein the electric motor and the push tube both extend away from the gearbox in a first direction.

16. The scissor lift of claim 14, wherein the second support member extends above the first support member.

17. The scissor lift of claim 14, wherein a trunnion rod is received within the trunnion mount, wherein the trunnion rod protrudes laterally outwardly from both a first side and an opposing second side of the housing.

18. A scissor lift, comprising:
    a base;
    a platform configured to support a load;
    a lift assembly having a first end coupled to the base and a second end coupled to the platform, the lift assembly including:
        a first support member pivotally coupled to a second support member; and
        a third support member pivotally coupled to a fourth support member, the third support member and the fourth support member extending above the first support member and the second support member; and a linear actuator coupled to the lift assembly and configured to extend to raise the platform relative to the base, the linear actuator including:

a gearbox;

a housing including (a) an elongated member, (b) a first mount coupled to the first support member, (c) an outer tube, and (d) a connection portion extending between the outer tube and the gearbox, the first mount defining an aperture that extends laterally through the connection portion from a first side of the connection portion to an opposing second side;

a screw coupled to the housing and received within the elongated member;

a nut engaging the screw;

a push tube coupled to the nut and slidably received within the elongated member, the push tube including a second mount that is coupled to the third support member; and an electric motor coupled to the housing and configured to drive rotation of the screw relative to the nut, the electric motor being offset from the elongated member.

19. The scissor lift of claim 18, wherein the screw extends within the push tube, and wherein the push tube extends between the screw and the elongated member.

20. The scissor lift of claim 18, wherein the first mount includes a trunnion rod that is received within the aperture and protrudes outwardly from both the first side and the opposing second side of the connection portion.

* * * * *